United States Patent
Yoshida

(10) Patent No.: US 11,059,536 B2
(45) Date of Patent: Jul. 13, 2021

(54) TRANSPORT DEVICE

(71) Applicant: Rakuten, Inc., Tokyo (JP)

(72) Inventor: Satoru Yoshida, Tokyo (JP)

(73) Assignee: Rakuten, Inc., Tokyo (JP)

( * ) Notice: Subject to any disclaimer, the term of this patent is extended or adjusted under 35 U.S.C. 154(b) by 215 days.

(21) Appl. No.: 16/471,657

(22) PCT Filed: Dec. 21, 2016

(86) PCT No.: PCT/JP2016/088113
§ 371 (c)(1),
(2) Date: Jun. 20, 2019

(87) PCT Pub. No.: WO2018/116406
PCT Pub. Date: Jun. 28, 2018

(65) Prior Publication Data
US 2019/0382066 A1    Dec. 19, 2019

(51) Int. Cl.
*B62J 7/04*         (2006.01)
*B62J 9/00*         (2020.01)
(Continued)

(52) U.S. Cl.
CPC . *B62J 7/04* (2013.01); *B62J 9/00* (2013.01); *B62J 9/23* (2020.02); *B65D 81/07* (2013.01)

(58) Field of Classification Search
CPC ....... B62J 7/04; B62J 9/23; B62J 9/00; B65D 81/07; B65D 81/075; B65D 5/5028; B65D 81/05; A45C 13/02
See application file for complete search history.

(56) References Cited

U.S. PATENT DOCUMENTS 2,653,709 A * 9/1953 Cunningham ......... B65D 81/07
                                               206/335
4,013,170 A * 3/1977 Hutterer ................ B65D 81/07
                                               206/521
(Continued)

FOREIGN PATENT DOCUMENTS

EP          2 003 045 A1    12/2008
JP      2008-230292 A    10/2008
(Continued)

OTHER PUBLICATIONS

International Search Report for PCT/JP2016/088113, dated Feb. 21, 2017.

*Primary Examiner* — Corey N Skurdal
(74) *Attorney, Agent, or Firm* — Sughrue Mion, PLLC

(57) ABSTRACT

A conveying apparatus includes an outer casing for disposing the conveying apparatus on a traveling structure, a storage case that is disposed inside the outer casing and that allows a stored article to be placed therein and removed therefrom from above, a plurality of stretchable elastic members that are spaced apart from each other in a crosswise direction and each of which includes a bridging portion that bridges between front and rear ends of the outer casing in a traveling direction of the traveling structure, and a plurality of suspension devices that are spaced apart from each other at least in a fore-aft direction and each of which includes an upper end assuming a supported portion that is supported slidably on the elastic member and a lower end assuming a supporting portion that supports the storage case.

6 Claims, 21 Drawing Sheets

(51) Int. Cl.
*B65D 81/07* (2006.01)
*B62J 9/23* (2020.01)

(56) References Cited

U.S. PATENT DOCUMENTS

| | | | | |
|---|---|---|---|---|
| 5,645,262 A | * | 7/1997 | Hamlin | B60R 11/0211 |
| | | | | 248/581 |
| 5,823,348 A | * | 10/1998 | Phillips | B65D 81/07 |
| | | | | 206/583 |
| 7,516,597 B1 | * | 4/2009 | Roose | B65B 55/20 |
| | | | | 53/139.5 |
| 2015/0266646 A1 | * | 9/2015 | Feng | B65D 81/075 |
| | | | | 206/583 |
| 2016/0137384 A1 | * | 5/2016 | Buelna | B65D 81/07 |
| | | | | 206/583 |

FOREIGN PATENT DOCUMENTS

| | | |
|---|---|---|
| JP | 2012-116326 A | 6/2012 |
| JP | 2014-184748 A | 10/2014 |
| WO | 2012/001723 A1 | 1/2012 |

\* cited by examiner

TRANSPORT DEVICE

CROSS REFERENCE TO RELATED APPLICATIONS

This Application is a National Stage of International Application No. PCT/JP2016/088113 filed Dec. 21, 2016.

TECHNICAL FIELD

The present invention relates to a conveying apparatus for conveying a stored article using a traveling structure.

BACKGROUND ART

A known conveying apparatus is disposed in a traveling structure, such as a bicycle, a scooter, or an automobile, and conveys a stored article, such as food, stored thereinside through the traveling structure (see, for example, Patent Literature 1, Patent Literature 2, and Patent Literature 3).

Such a conveying apparatus is used in, for example, home delivery to an orderer from a store that has received the order or a distribution center and is disposed on a cargo deck of, for example, a bicycle or a scooter.

CITATION LIST

Patent Literatures

Patent Literature 1: JP 2014-184748 A
Patent Literature 2: JP 2012-116326 A
Patent Literature 3: JP 2008-230292 A

SUMMARY OF INVENTION

Technical Problem

With the conveying apparatus used in, for example, home delivery, the stored article, because of being conveyed by the traveling structure, is subjected to external force due to, for example, vibration and acceleration and deceleration, while the traveling structure is traveling. The external force to be applied to the stored article tends to be large particularly during traveling along a slope, in addition to sudden acceleration and sudden deceleration.

The stored article is moved or swayed inside the conveying apparatus when an external force is applied to the stored article during traveling. If the stored article is moved or swayed excessively and if the stored article is food in particular, the food may spill from a container thereof or an arrangement thereof may change.

It is therefore an object of a conveying apparatus according to the present invention to deal with problems as described above and achieve a steady storage condition for a stored article during traveling of a traveling structure.

Solution to Problem

First, a conveying apparatus according to the present invention includes: an outer casing for disposing the conveying apparatus on a traveling structure; a storage case that is disposed inside the outer casing and that allows a stored article to be placed therein and removed therefrom from above; a plurality of stretchable elastic members that are spaced apart from each other in a crosswise direction and each of which includes a bridging portion that bridges between front and rear ends of the outer casing in a traveling direction of the traveling structure; and a plurality of suspension devices that are spaced apart from each other at least in a fore-aft direction and each of which includes an upper end assuming a supported portion that is supported slidably on the elastic member and a lower end assuming a supporting portion that supports the storage case. In the conveying apparatus, the suspension devices are supported by the elastic members pivotally rockably about the supported portions, the storage case is supported by the suspension devices pivotally rockably about the supporting portions, and the storage case is suspended on the elastic members by the suspension devices under a condition in which a gap is available between the storage case and the outer casing.

The configuration allows the storage case to be moved in the fore-aft direction relative to the outer casing and to be rocked about the supported portions during traveling of the traveling structure.

Second, in the conveying apparatus described above, preferably, the elastic members are disposed in parallel with each other.

The configuration results in a distance between the elastic members remaining constant at any position in the fore-aft direction. Thus, the storage case is hard to incline with respect to the vertical direction.

Third, in the conveying apparatus described above, preferably, the elastic members include two elastic members, and the bridging portions of the two elastic members are disposed at positions immediately above both ends in the crosswise direction, respectively, of the storage case.

The configuration provides a greater distance between the elastic members, so that the storage case is held in a steady state in the crosswise direction.

Fourth, in the conveying apparatus described above, preferably, the suspension devices each include a connecting portion that connects between the supported portion and the supporting portion and the connecting portions are disposed between the storage case and the outer casing.

The configuration reduces a space taken up by the suspension devices inside the storage case.

Fifth, in the conveying apparatus described above, preferably, the conveying apparatus further includes a tension adjustment structure that adjusts tension in the elastic members.

The configuration enables the position at which the storage case is suspended with respect to the outer casing and a stretch state of the elastic members during traveling of the traveling structure to be varied through adjustment of the tension in the elastic members.

Sixth, in the conveying apparatus described above, preferably, each of both ends of each of the elastic members in a direction in which the elastic member is stretched assumes an attached portion to be attached on the traveling structure.

The configuration allows the both ends of each of the elastic members to be attached to the traveling structure to thereby enable the bridging portions to bridge between front and rear ends of the outer casing.

Advantageous Effects of Invention

In accordance with the aspect of the present invention, while the traveling structure is traveling, the storage case is movable in the fore-aft direction relative to the outer casing and is pivotally rockable about the supported portions. Thus, the storage case is moved in a direction in which the storage case is displaced in the vertical direction regardless of posture of the outer casing, so that a steady storage condition can be achieved for the stored article during traveling of the traveling structure.

DESCRIPTION OF EMBODIMENTS

The following describes, with reference to the accompanying drawings, modes for carrying out a conveying apparatus according to the present invention.

The following describes an example in which the conveying apparatus is disposed on a cargo deck of a bicycle as a traveling structure. The conveying apparatus may nonetheless be disposed on, for example, a cargo deck of another traveling structure of a two-wheeled, three-wheeled, or four-wheeled motorcycle or automobile, and the like.

<Configuration of Traveling Structure>

Figure 1:
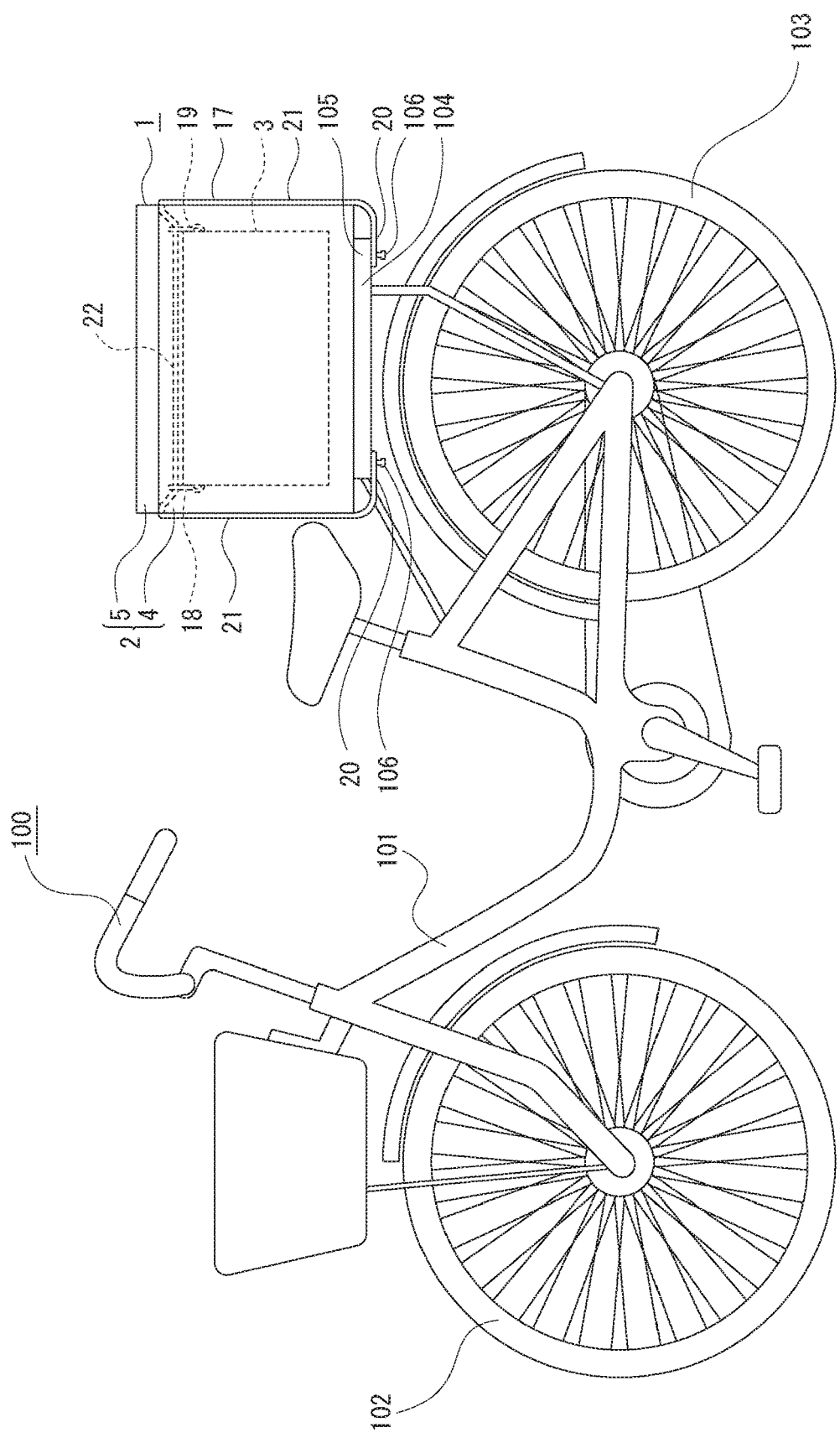
FIG. 1 is a side elevation view of a conveying apparatus disposed on a traveling structure, depicting, as with FIGS. 2 to 21, the conveying apparatus according to an embodiment of the present invention.
Figure 2:
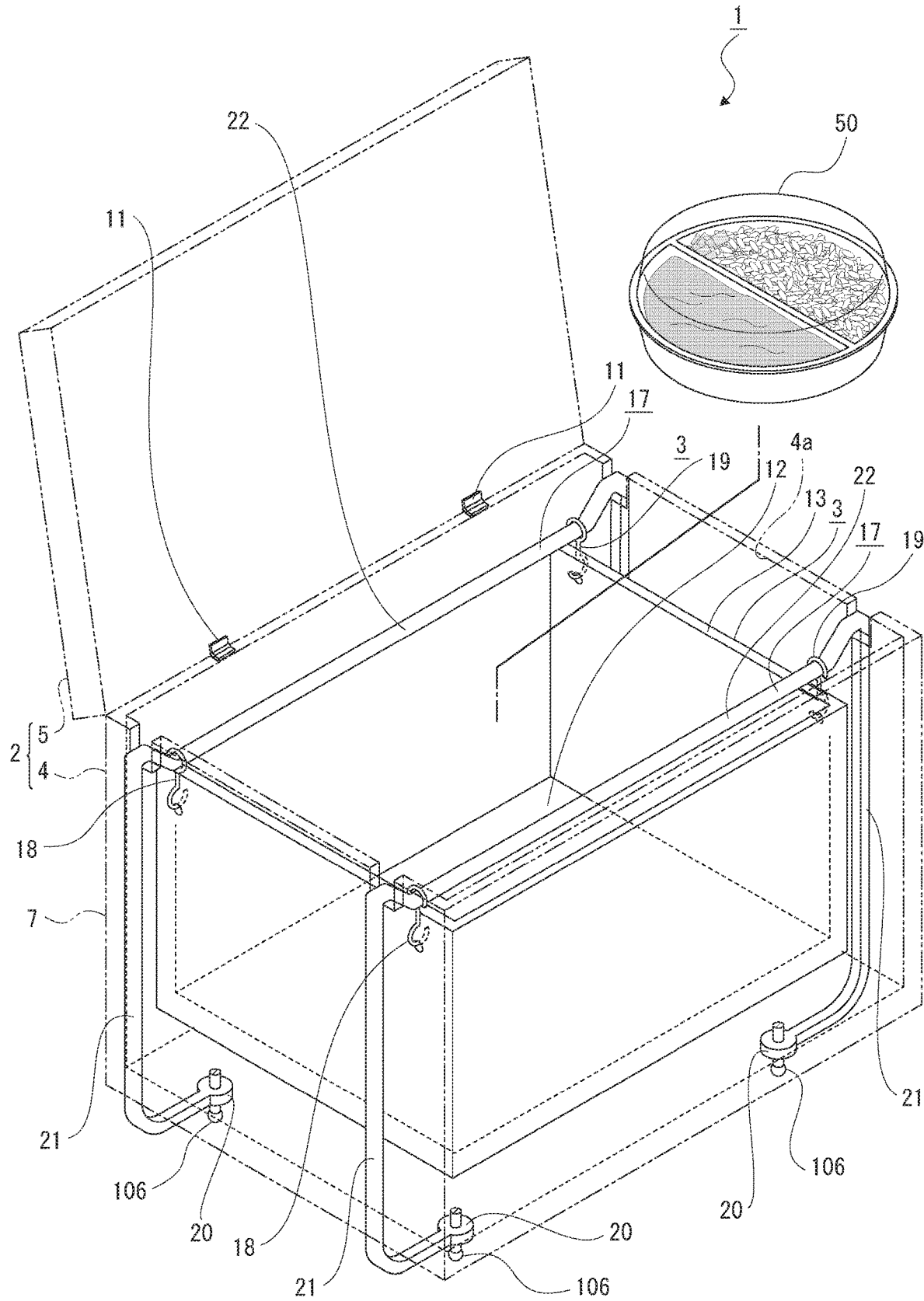
FIG. 2 is a perspective view of the conveying apparatus.
Figure 3:
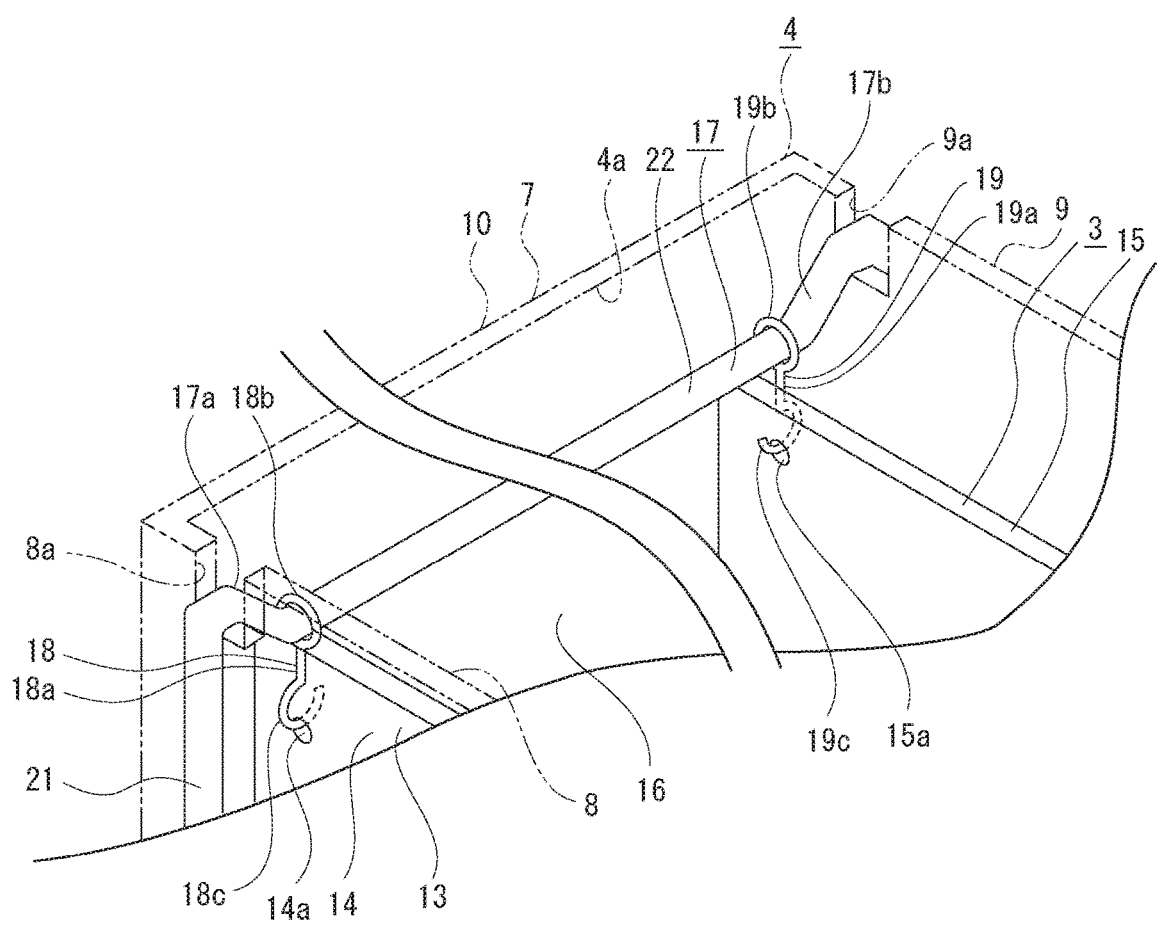
FIG. 3 is an enlarged perspective view of a part of the conveying apparatus.

A general configuration of a traveling structure (bicycle) will first be described (see FIG. 1).

This traveling structure 100 includes a vehicle body 101, a front wheel 102, and a rear wheel 103. The vehicle body 101 includes a handlebar and a saddle, and the like. The front wheel 102 and the rear wheel 103 are supported by the vehicle body 101. A cargo deck 104, which is coupled with the vehicle body 101, is disposed superior to the rear wheel 103.

The cargo deck 104 includes a mounting stand 105 and mounting protrusions 106, 106, . . . . The mounting stand 105 is positioned in a horizontal state. The mounting protrusions 106, 106, . . . protrude downwardly from a lower surface of the mounting stand 105. The mounting protrusions 106, 106, . . . are spaced away from each other in a crosswise direction and a fore-aft direction. The mounting protrusions 106, 106, . . . comprise, for example, four mounting protrusions, two each being disposed at front and rear on either side in the crosswise direction.

<Configuration of Conveying Apparatus>

A configuration of a conveying apparatus will be described below (see, for example, FIGS. 2 to 5).

This conveying apparatus 1 includes an outer casing 2 and a storage case 3.

The outer casing 2 includes, for example, a box-shaped case portion 4 and a cover portion 5. The case portion 4 is open upwardly. The cover portion 5 opens and closes an opening 4a in the case portion 4. The outer casing 2 assumes a structure for disposing the conveying apparatus 1 on the cargo deck 104.

The case portion 4 includes a bottom surface panel portion 6 and an outer peripheral panel portion 7. The bottom surface panel portion 6 is placed on the mounting stand 105 of the traveling structure 100. The outer peripheral panel portion 7 protrudes upwardly from an outer peripheral portion of the bottom surface panel portion 6. The outer peripheral panel portion 7 is composed of a front surface panel portion 8, a rear surface panel portion 9, and a pair of side surface panel portions 10, 10. The front surface panel portion 8 and the rear surface panel portion 9 are disposed to be spaced apart in the fore-aft direction. The side surface panel portions 10, 10 are disposed on either side in the crosswise direction.

The front surface panel portion 8 and the rear surface panel portion 9 have locking recesses 8a, 8a, 9a, 9a formed in respective upper end portions thereof. The locking recesses 8a, 8a, 9a, 9a are open upwardly. The locking recesses 8a, 8a and the locking recesses 9a, 9a are each spaced apart from each other in the crosswise direction. The locking recesses 8a, 8a, 9a, 9a are formed at positions closer to either lateral side.

The cover portion 5 is coupled with an upper end portion of one of the side surface panel portions 10, 10 rotatably (openably) via hinges 11, 11, for example. The cover portion 5 is pivotally rotated about the hinges 11, 11 to thereby open or close the opening 4a in the case portion 4.

It is noted that the cover portion 5 may not have to be coupled with the case portion 4. The cover portion 5 may, for example, be configured so as to be removed from the case portion 4 under a condition in which the opening 4a in the case portion 4 is not closed.

The storage case 3 is formed, for example, into a box shape opening upwardly and has an outline shape smaller than the outer casing 2. The storage case 3 is disposed under a condition in which the storage case 3 is suspended inside the outer casing 2.

The storage case 3 includes a bottom surface portion 12 and an outer peripheral surface portion 13. The bottom surface portion 12 has a plate shape facing in a vertical direction. The outer peripheral surface portion 13 protrudes upwardly from an outer peripheral portion of the bottom surface portion 12. The outer peripheral surface portion 13 is composed of a front surface portion 14 and a rear surface portion 15, and a pair of side surface portions 16, 16. The front surface portion 14 and the rear surface portion 15 are disposed to be spaced apart in the fore-aft direction. The side surface portions 16, 16 are disposed on either side in the crosswise direction.

The front surface portion 14 and the rear surface portion 15 have supported holes 14a, 14a, 15a, 15a formed in positions closer to respective upper end portions thereof. The supported holes 14a, 14a and the supported holes 15a, 15a are each spaced apart from each other in the crosswise direction. The supported holes 14a, 14a, 15a, 15a are formed at positions closer to either lateral side.

The storage case 3 has an internal space defined as a storage space 3a. A stored article 50, such as food, is stored in the storage space 3a.

The storage case 3 is suspended on elastic members 17, 17 via front-side suspension devices 18, 18 and rear-side suspension devices 19, 19.

The elastic members 17, 17 are each, for example, a strap-shaped rubber member including annular attached portions 20, 20 disposed on both ends in a stretching direction (longitudinal direction). Each of the elastic members 17, 17 includes extended portions 21, 21 and a bridging portion 22. Out of a portion extending between the attached portions 20, 20, the extended portions 21, 21 are continuous from the respective attached portions 20, 20 and a portion between the extended portions 21, 21 assumes the bridging portion 22.

Each of the elastic members 17, 17 is formed to have a curved, for example, circular outer peripheral surface excepting the attached portions 20, 20.

Each of the front-side suspension devices 18, 18 includes, for example, a linear connecting portion 18a, an arcuate (hook-shaped) supported portion 18b, and an arcuate (hook-shaped) supporting portion 18c. The supported portion 18b joins an upper end of the connecting portion 18a. The supporting portion 18c joins a lower end of the connecting portion 18a. The supported portion 18b has an axis orthogonal to an axis of the supporting portion 18c.

Each of the rear-side suspension devices 19, 19 includes, for example, a linear connecting portion 19a, an arcuate (hook-shaped) supported portion 19b, and an arcuate (hook-shaped) supporting portion 19c. The supported portion 19b joins an upper end of the connecting portion 19a. The supporting portion 19c joins a lower end of the connecting portion 19a. The supported portion 19b has an axis orthogonal to an axis of the supporting portion 19c.

Under a condition in which the bottom surface panel portion 6 of the outer casing 2 is placed on the mounting stand 105 of the cargo deck 104, the attached portions 20, 20, . . . are mounted on the respective mounting protrusions 106, 106, . . . of the elastic members 17, 17. At this time, the cover portion 5 of the outer casing 2 is open and the elastic members 17, 17 are mounted on the outer casing 2 by having portions thereof bridging between the front surface panel portion 8 and the rear surface panel portion 9. The portion of the elastic member 17 bridging between the front surface panel portion 8 and the rear surface panel portion 9 functions as the bridging portion 22 and the portion of the elastic member 17 between the bridging portion 22 and the attached portion 20, 20 functions as the extended portion 21, 21.

Both ends of the bridging portion 22 of the elastic member 17 are inserted in the locking recesses 8a and 9a in the front surface panel portion 8 and the rear surface panel portion 9, respectively. The insertion of the both ends of the bridging portion 22 of the elastic member 17 in the locking recesses 8a and 9a in the front surface panel portion 8 and the rear surface panel portion 9, respectively, causes the elastic member 17 to be positioned correctly in the crosswise direction relative to the outer casing 2, so that the elastic member 17 is restricted from being displaced in the crosswise direction.

The elastic members 17, 17, when mounted in the outer casing 2, are placed in a condition in which the elastic members 17, 17 extend in parallel with each other. Preferably, at this time, the elastic members 17, 17 are mounted in the outer casing 2 by being stretched to be elastically deformed. The mounting of the elastic members 17, 17 under a condition of being stretched in the outer casing 2 causes the elastic members 17, 17 to exert an external force on the case portion 4 of the outer casing 2. As a result, the bottom surface panel portion 6 is pressed up against the mounting stand 105 from above, so that a steady mounting condition can be achieved with respect to the cargo deck 104 of the conveying apparatus 1.

Thus, the conveying apparatus 1 is mounted on the cargo deck 104 by the elastic members 17, 17. Specifically, the elastic members 17, 17 serve a function of mounting the conveying apparatus 1 on the cargo deck 104, in addition to a function of suspending the storage case 3, so that functionality of the elastic members 17, 17 can be enhanced. The elastic members 17, 17's serving the function of suspending the storage case 3 and the function of mounting the conveying apparatus 1 on the cargo deck 104 eliminates the need for additional member or work allocated to the mounting of the conveying apparatus 1 on the cargo deck 104. Thus, the mounting of the conveying apparatus 1 can be easily performed through simple steps without involving an increased number of parts used.

The supported portion 18b of the front-side suspension device 18 and the supported portion 19b of the rear-side suspension device 19 are assembled with the elastic member 17.

The supporting portions 18c, 18c of the front-side suspension devices 18, 18 and the supporting portions 19c, 19c of the rear-side suspension devices 19, 19 are inserted in the supported holes 14a, 14a and the supported holes 15a, 15a, respectively, in the storage case 3, which is disposed inside the outer casing 2. Thus, the storage case 3 is suspended on the elastic members 17, 17, which are mounted in the outer casing 2, by the front-side suspension devices 18, 18 and the rear-side suspension devices 19, 19.

At this time, preferably, the supporting portion 18c of the front-side suspension device 18 and the supporting portion 19c of the rear-side suspension device 19 are inserted in the supported hole 14a and the supported hole 15a, respectively, from a front surface side of the front surface portion 14 and a rear surface side of the rear surface portion 15, respectively.

The insertion of the supporting portions 18c and 19c in the supported holes 14a and 15a from the front surface side of the front surface portion 14 and the rear surface side of the rear surface portion 15 causes the connecting portions 18a and 19a to be disposed between the outer peripheral surface portion 13 of the storage case 3 and the outer peripheral panel portion 7 of the outer casing 2. The foregoing configuration results in a reduced space taken up by the front-side suspension device 18 and the rear-side suspension device 19 in the storage space 3a of the storage case 3, compared with a configuration in which the supporting portions 18c and 19c are inserted in the supported holes 14a and 15a from a rear surface side of the front surface portion 14 and a front surface side of the rear surface portion 15.

Thus, because the connecting portions 18a and 19a are disposed between the storage case 3 and the outer casing 2, the front-side suspension device 18 and the rear-side suspension device 19 do not serve as a hindrance for the stored article 50 to be placed in, and removed from, the storage case 3. Thus, placement of the stored article 50 in, and removal of the stored article 50 from, the storage space 3a of the storage case 3 can be performed easily.

The insertion of the supporting portions 18c and 19c in the supported holes 14a and 15a from the front surface side of the front surface portion 14 and the rear surface side of the rear surface portion 15 provides a greater distance between the front-side suspension device 18 and the rear-side suspension device 19, compared with the insertion of the supporting portions 18c and 19c in the supported holes 14a and 15a from the rear surface side of the front surface portion 14 and the front surface side of the rear surface portion 15. Thus, the storage case 3 can be suspended in a steady state on the elastic members 17, 17 by the front-side suspension devices 18, 18 and the rear-side suspension devices 19, 19.

The storage case 3 is suspended under a condition in which a gap exists between an outer surface of the outer peripheral surface portion 13 and an inner surface of the outer peripheral panel portion 7 of the outer casing 2, and a gap exists between a bottom surface of the bottom surface portion 12 and an upper surface of the bottom surface panel portion 6 of the outer casing 2. At this time, in the elastic member 17, the bridging portion 22 bridges between the front surface panel portion 8 and the rear surface panel portion 9 of the outer casing 2 and the extended portions 21, 21 are brought into tight contact with the front surface of the front surface panel portion 8 and the rear surface of the rear surface panel portion 9, respectively.

Under a condition in which the storage case 3 is suspended, the supported portions 18b, 18b of the front-side suspension devices 18, 18 and the supported portions 19b, 19b of the rear-side suspension devices 19, 19 are slidable on the elastic members 17, 17. Thus, because the supported portions 18b, 18b and the supported portions 19b, 19b are slidable with respect to the elastic members 17, 17, the storage case 3 is movable with respect to the outer casing 2 in the fore-aft direction.

Under a condition in which the storage case 3 is suspended on the elastic members 17, 17 by the front-side suspension devices 18, 18 and the rear-side suspension devices 19, 19, weight of the front-side suspension devices 18, 18, the rear-side suspension devices 19, 19, and the storage case 3 causes the elastic members 17, 17 to stretch, so that the supported portions 18b, 18b of the front-side suspension devices 18, 18 and the supported portions 19b, 19b of the rear-side suspension devices 19, 19 are disposed inferior to an upper end of the outer casing 2. At this time, portions in the elastic members 17, 17 between the supported portions 18b, 18b and the front surface panel portion 8 and portions in the elastic members 17, 17 between the supported portions 19b, 19b and the rear surface panel portion 9 are each inclined such that an end on the side of the storage case 3 is displaced downwardly. The portions inclined in the elastic members 17, 17 are referred to as front-side inclined portions 17a, 17a, which are disposed on the front side, and as rear-side inclined portions 17b, 17b, which are disposed on the rear side.

The front-side inclined portion 17a and the rear-side inclined portion 17b are stretched within a range of elastic deformation by weight of, for example, the storage case 3. The front-side inclined portion 17a is set to have a stretch amount identical to a stretch amount set for the rear-side inclined portion 17b under a reference state in which a center of the storage case 3 in the fore-aft direction is aligned with a center between the front surface panel portion 8 and the rear surface panel portion 9 of the outer casing 2. The stretch amount of the front-side inclined portion 17a and the rear-side inclined portion 17b is further set to be variable depending on a position to which the front-side suspension device 18 and the rear-side suspension device 19 are moved in the fore-aft direction such that, when the front-side suspension device 18 and the rear-side suspension device 19 are moved in the fore-aft direction relative to the reference state as a result of the storage case 3 having slid relative to the elastic member 17.

When, for example, the storage case 3 is moved toward the rear from the reference state, the front-side inclined portion 17a has a length longer than a length of the rear-side inclined portion 17b. Then, the stretch amount of the front-side inclined portion 17a increases, while the stretch amount of the rear-side inclined portion 17b decreases, so that the front-side inclined portion 17a has a stretch amount greater than the stretch amount of the rear-side inclined portion 17b. In contrast, when the storage case 3 is moved toward the front from the reference state, the rear-side inclined portion 17b has a length longer than a length of the front-side inclined portion 17a. Then, the stretch amount of the rear-side inclined portion 17b increases, while the stretch amount of the front-side inclined portion 17a decreases, so that the rear-side inclined portion 17b has a stretch amount greater than the stretch amount of the front-side inclined portion 17a.

When the elastic members 17, 17 are not fixed to the front surface panel portion 8 and the rear surface panel portion 9 under a condition in which the storage case 3 is suspended as described above, the weight of the front-side suspension devices 18, 18, the rear-side suspension devices 19, 19, and the storage case 3 causes the elastic members 17, 17 to stretch. Then, the elastic members 17, 17 exert an external force further on the case portion 4 of the outer casing 2. As a result, the bottom surface panel portion 6 is further pressed up against the mounting stand 105 from above, so that an even steadier mounting condition can be achieved with respect to the cargo deck 104 of the conveying apparatus 1.

The front-side suspension devices 18, 18 and the rear-side suspension devices 19, 19 are pivotally rockable about the supported portions 18b, 18b and supported portions 19b, 19b, respectively, by the elastic members 17, 17.

Under the condition in which the storage case 3 is suspended as described above, opening the cover portion 5 enables the stored article 50 to be placed in, and removed from, the storage space 3a of the storage case 3.

It is noted that, when the storage case 3 is suspended, the elastic members 17, 17 are placed in the locking recesses 8a, 8a, 9a, 9a, so that the cover portion 5 does not interfere with the elastic members 17, 17 when the cover portion 5 is closed relative to the case portion 4. The cover portion 5 can thus be brought into tight contact with the case portion 4 and a favorable closure state can be achieved of the outer casing 2.

The portions of the elastic members 17, 17 placed in the locking recesses 8a, 8a, 9a, 9a may be fixed to the front surface panel portion 8 and the rear surface panel portion 9 by appropriate fixing devices. It is noted that the conveying apparatus 1 may even be configured so as not to have the locking recesses 8a, 8a, 9a, 9a in the front surface panel portion 8 and the rear surface panel portion 9. In this case, the cover portion 5 is closed relative to the case portion 4, under which condition the cover portion 5 presses the elastic members 17, 17 up against the front surface panel portion 8 and the rear surface panel portion 9, thereby the elastic members 17, 17 are fixed to the storage case 3.

When the elastic members 17, 17 are not fixed in the front surface panel portion 8 and the rear surface panel portion 9 under a condition in which the stored article 50 is stored in the storage space 3a of the storage case 3, the weight of the stored article 50 further stretches the elastic members 17, 17. Then, the elastic members 17, 17 exert an external force further on the case portion 4 of the outer casing 2. As a result, the bottom surface panel portion 6 is further pressed up against the mounting stand 105 from above, so that an even steadier mounting condition can be achieved with respect to the cargo deck 104 of the conveying apparatus 1.

It is noted that the elastic members 17, 17 are each required to include at least the bridging portion 22, which bridges between the front surface panel portion 8 and the rear surface panel portion 9 of the outer casing 2, and may each be configured so as not to include the attached portions 20, 20 and the extended portions 21, 21. In this case, the both ends of the elastic members 17, 17 need to be fixed to the upper surface of the front surface panel portion 8 and the upper surface of the rear surface panel portion 9 by appropriate fixing devices. Additionally, mounting on the cargo deck 104 of the conveying apparatus 1 is performed by any device other than the elastic members 17, 17, for example, using screws or fixing devices for mounting.

It is, however, noted that the attached portions 20, 20 provided on the both ends of the elastic member 17 as described above enable the both ends of the elastic member 17 to be attached to the mounting protrusions 106, 106 of the traveling structure 100, to thereby allow the bridging portion 22 to bridge between the front and rear ends of the outer casing 2. Workability can thus be enhanced in mounting the elastic member 17 on the outer casing 2.

Additionally, no need exists to use additional device for mounting on the cargo deck 104 of the conveying apparatus 1 in addition to the elastic member 17 and mounting of the conveying apparatus 1 on the traveling structure 100 can be performed simultaneously with the mounting of the elastic member 17 on the outer casing 2. Thus, workability can be enhanced, while reduction in the number of parts used is achieved.

<Operation of Conveying Apparatus>

The following describes operation of the conveying apparatus 1 when the stored article 50 is conveyed by the traveling structure 100 (see FIGS. 4 to 11). It is noted that FIGS. 4 to 11 each indicate an imaginary horizontal plane H for easier understanding of inclined conditions of the outer casing 2 and the storage case 3.

The following first describes operation of the conveying apparatus 1 when the traveling structure 100 travels along a level road surface that is not inclined.

Figure 4:
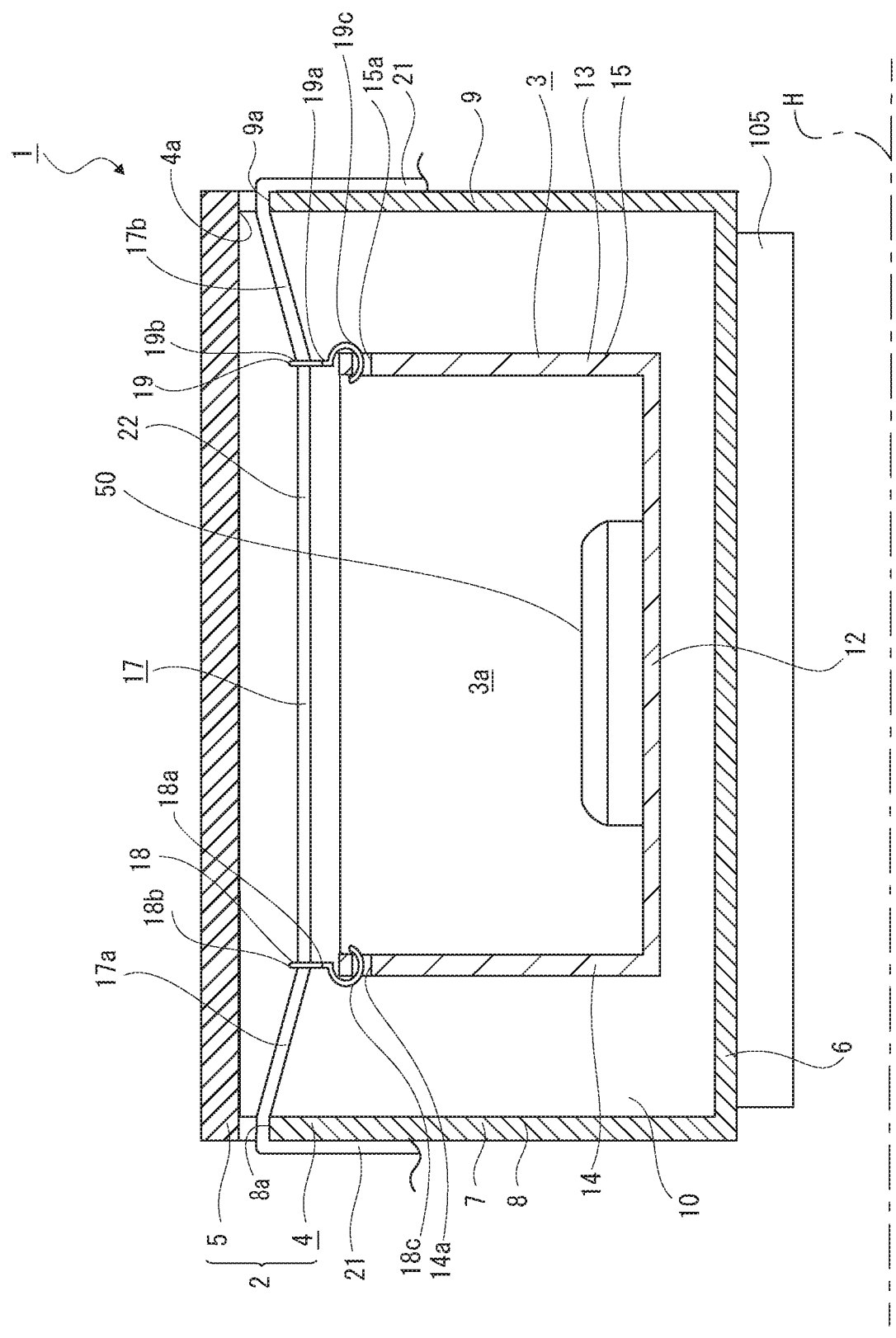
FIG. 4 is a cross-sectional view of the conveying apparatus as viewed from a crosswise direction.
Figure 5:
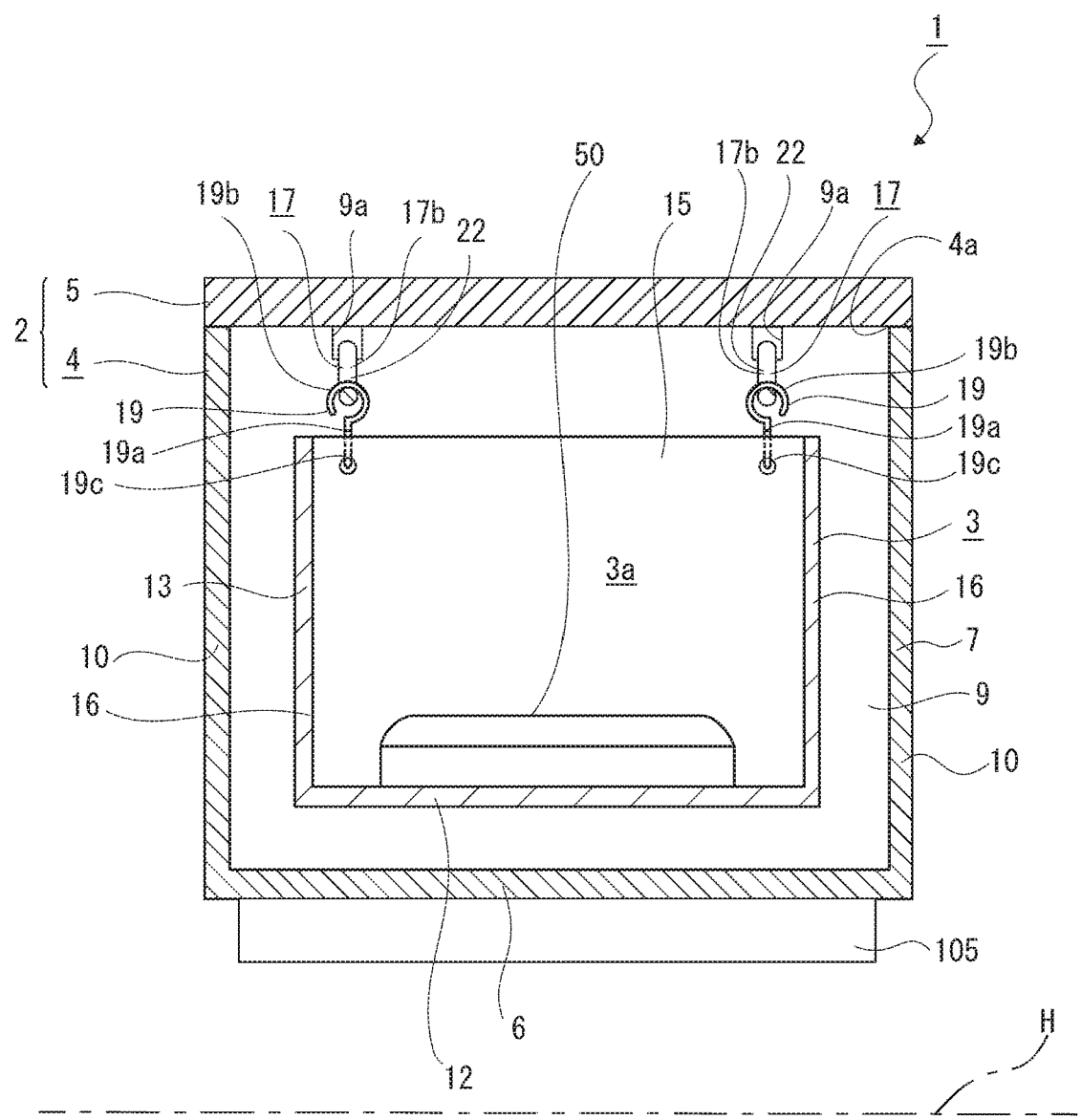
FIG. 5 is a cross-sectional view of the conveying apparatus as viewed from a fore-aft direction.
Figure 6:
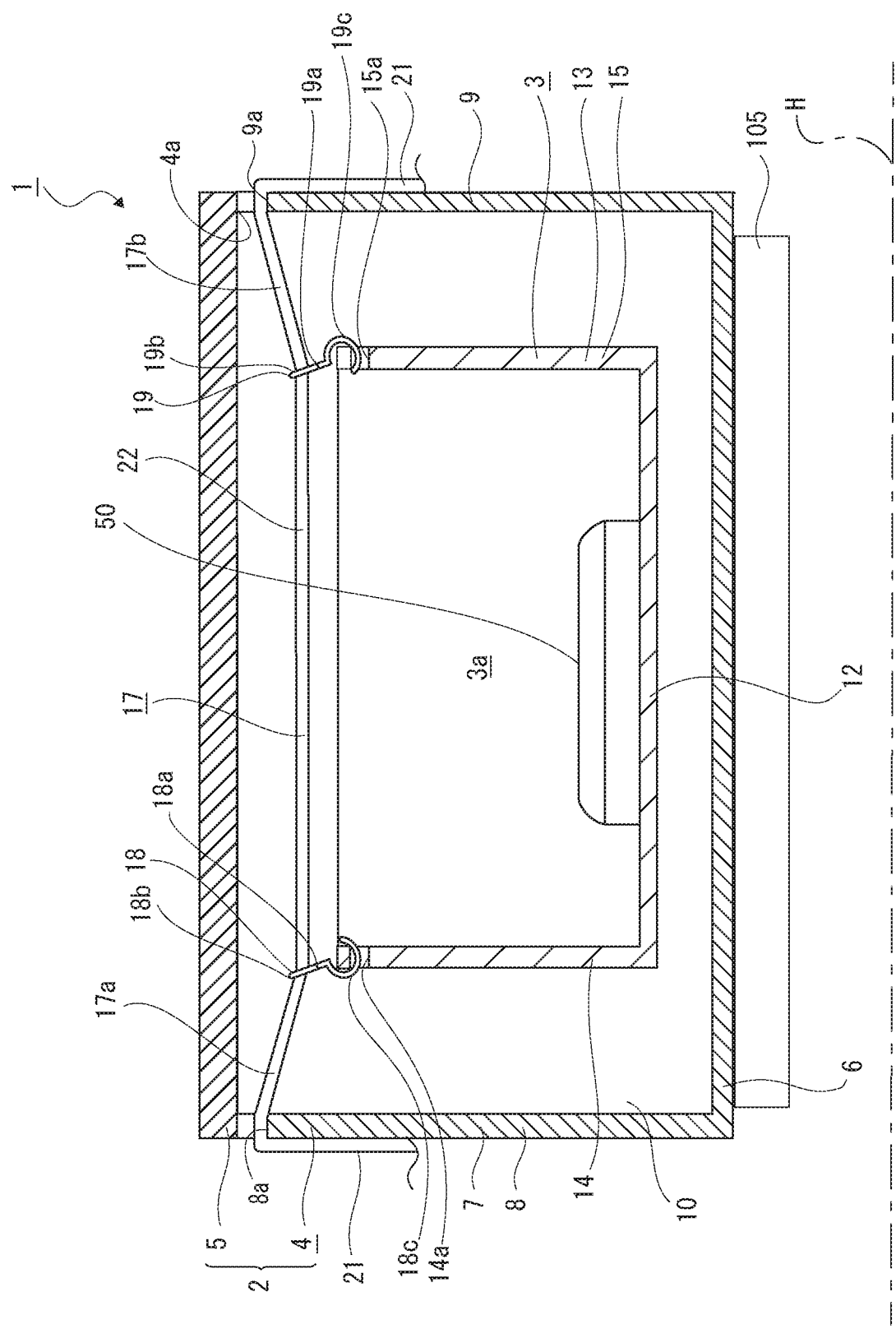
FIG. 6 is a cross-sectional view of the conveying apparatus when a traveling structure is accelerated.
Figure 7:
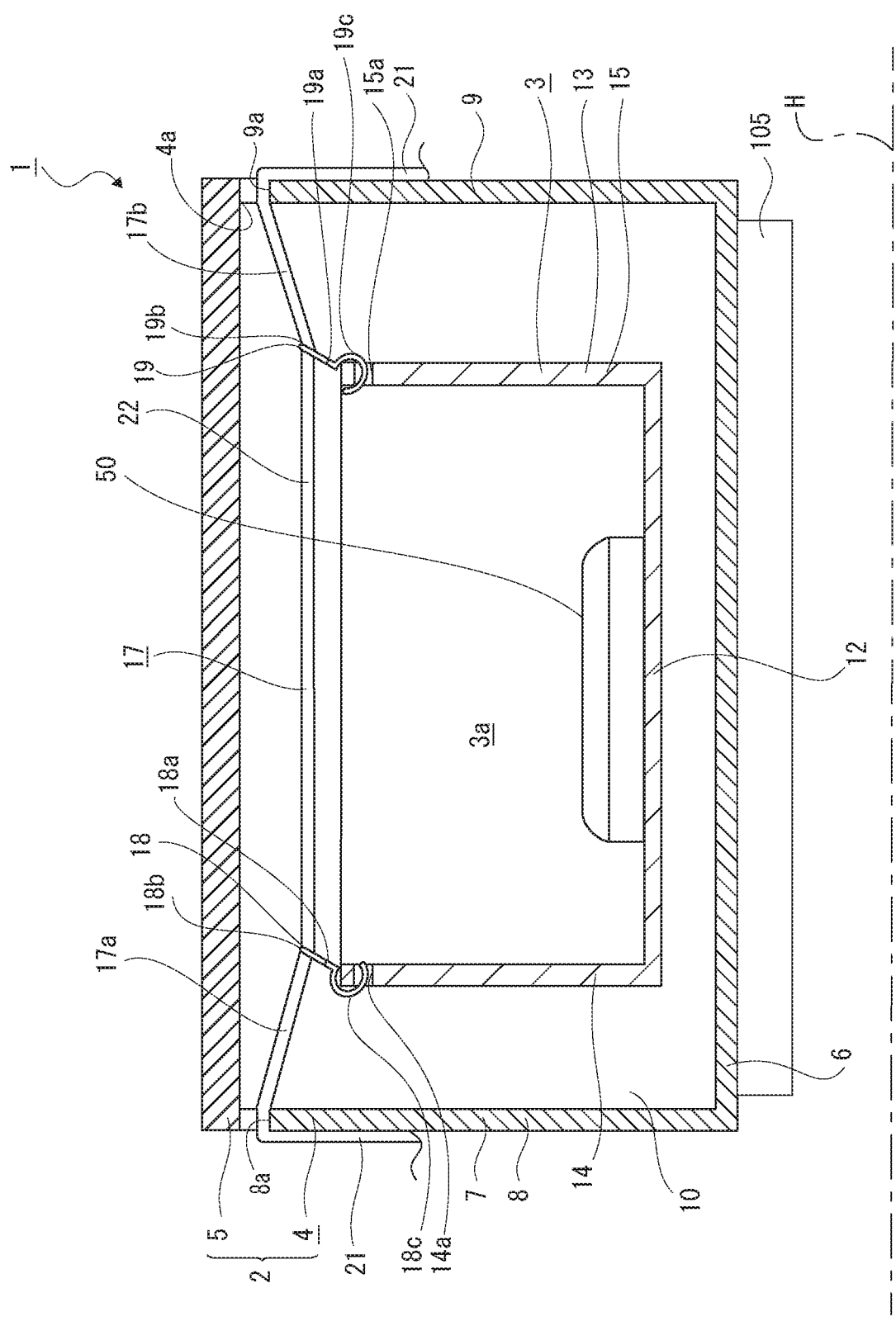
FIG. 7 is a cross-sectional view of the conveying apparatus when the traveling structure is decelerated.

When the bottom surface panel portion 6 of the outer casing 2 is level under a condition before the traveling structure 100 travels, the suspended storage case 3 is placed in the reference state in which the lower surface of the bottom surface portion 12 faces in the vertical direction (gravitational direction) and extends in parallel with the bottom surface panel portion 6 (see FIGS. 4 and 5). In the following, a condition of the storage case 3 in which the lower surface of the bottom surface portion 12 faces in the vertical direction will be referred to as an "equilibrium state."

When the traveling structure 100 is started and accelerated, the conveying apparatus 1 mounted on the cargo deck 104 advances as the traveling structure 100 advances. A force is, however, exerted by inertia on the front-side suspension device 18 and the rear-side suspension device 19, which are slidably supported by the elastic member 17, to move the front-side suspension device 18 and the rear-side suspension device 19 toward the rear with respect to the elastic member 17. The inertia also exerts a force on the suspended storage case 3 to move the storage case 3 toward the rear relative to the outer casing 2.

While the force is exerted on the front-side suspension device 18 and the rear-side suspension device 19 to relatively move toward the rear as described above, the rear-side inclined portion 17b, which is included in the elastic member 17 and which is inclined downwardly toward the front, restricts the rear-side suspension device 19 from moving toward the rear. Additionally, a friction force is generated between each of the front-side suspension device 18 and the rear-side suspension device 19 and the elastic member 17.

Thus, the rearward movement of the rear-side suspension device 19 is limited by the friction force and the restriction force of the rear-side inclined portion 17b. When the traveling structure 100 is accelerated, the front-side suspension device 18 and the rear-side suspension device 19 move toward the rear only a small amount or may not move at all toward the rear.

The amount of movement of the rear-side suspension device 19 toward the rear is limited by the friction force and the restriction force of the rear-side inclined portion 17b as described above. Even when the front-side suspension device 18 and the rear-side suspension device 19 are not moved toward the rear relative to the elastic member 17, however, because of the front-side suspension device 18 and the rear-side suspension device 19 being rockably supported by the elastic member 17, the supporting portion 18c of the front-side suspension device 18 and the supporting portion 19c of the rear-side suspension device 19 are pivotally rocked and moved toward the rear about the supported portion 18b and the supported portion 19b, respectively (see FIG. 6).

The storage case 3, on which a force to move toward the rear relative to the outer casing 2 is being exerted by inertia at this time, is pivotally rockable about the supporting portion 18c of the front-side suspension device 18 and the supporting portion 19c of the rear-side suspension device 19. Thus, the storage case 3, while being moved toward the rear relative to the outer casing 2, is pivotally rocked about the supporting portions 18c and 19c; however, the storage case 3 is not inclined in response to the movement of the front-side suspension device 18 and the rear-side suspension device 19, but maintains the equilibrium state.

As such, the storage case 3 maintains the equilibrium state even while the traveling structure 100 is being accelerated, so that the stored article 50 stored inside the storage case 3 is not inclined inside the storage case 3 and a favorable storage state of the stored article 50 can be achieved.

When the front-side suspension device 18 and the rear-side suspension device 19 are moved toward the rear relative to the elastic member 17 as the traveling structure 100 is accelerated, the length of the front-side inclined portion 17a becomes longer than the length of the rear-side inclined portion 17b and the storage case 3 is inclined downwardly toward the front. The amount of movement toward the rear of the front-side suspension device 18 and the rear-side suspension device 19 is, however, small as described above. Thus, an angle of inclination of the storage case 3 is small and an angle of inclination of the stored article 50 is small, too, when the front-side suspension device 18 and the rear-side suspension device 19 are moved toward the rear relative to the elastic member 17. A favorable storage state of the stored article 50 can thus be achieved in this case, too.

When the traveling structure 100 is decelerated from a traveling state, a force is exerted by inertia on the front-side suspension device 18 and the rear-side suspension device 19, which are slidably supported by the elastic member 17, to move the front-side suspension device 18 and the rear-side suspension device 19 toward the front relative to the elastic member 17. The inertia also exerts a force on the suspended storage case 3 to move the storage case 3 forward relative to the outer casing 2.

A force is exerted on the front-side suspension device 18 and the rear-side suspension device 19 to move the front-side suspension device 18 and the rear-side suspension device 19 relatively toward the front as such. Because of the front-side inclined portion 17a, which is inclined downwardly toward the rear, included in the elastic member 17, however, the front-side suspension device 18 is restricted from moving toward the front by the front-side inclined portion 17a. Additionally, a friction force is generated between each of the front-side suspension device 18 and the rear-side suspension device 19 and the elastic member 17.

Thus, the forward movement of the front-side suspension device 18 is limited by the friction force and the restriction force of the front-side inclined portion 17a. When the traveling structure 100 is decelerated, the front-side suspension device 18 and the rear-side suspension device 19 move toward the front only a small amount or may not move at all toward the front.

The amount of movement of the front-side suspension device 18 toward the front is limited by the friction force and the restriction force of the front-side inclined portion 17a as described above. Even when the front-side suspension device 18 and the rear-side suspension device 19 are not moved toward the front relative to the elastic member 17, however, because of the front-side suspension device 18 and the rear-side suspension device 19 being rockably supported by the elastic member 17, the supporting portion 18c of the front-side suspension device 18 and the supporting portion 19c of the rear-side suspension device 19 are pivotally rocked and moved toward the front about the supported portion 18b and the supported portion 19b, respectively (see FIG. 7).

The storage case 3, on which a force to move the storage case 3 toward the front relative to the outer casing 2 is being exerted by inertia at this time, is pivotally rockable about the supporting portion 18c of the front-side suspension device 18 and the supporting portion 19c of the rear-side suspension device 19. Thus, the storage case 3, while being moved toward the front relative to the outer casing 2, is pivotally rocked about the supporting portions 18c and 19c; however, the storage case 3 is not inclined in response to the movement of the front-side suspension device 18 and the rear-side suspension device 19, but maintains the equilibrium state.

As such, the storage case 3 maintains the equilibrium state even while the traveling structure 100 is being decelerated, so that the stored article 50 stored inside the storage case 3 is not inclined inside the storage case 3 and a favorable storage state of the stored article 50 can be achieved.

When the front-side suspension device 18 and the rear-side suspension device 19 are moved toward the front relative to the elastic member 17 as the traveling structure 100 is decelerated, the length of the rear-side inclined portion 17b becomes longer than the length of the front-side inclined portion 17a and the storage case 3 is inclined downwardly toward the rear. The amount of movement toward the front of the front-side suspension device 18 and the rear-side suspension device 19 is, however, small as described above. Thus, the angle of inclination of the storage case 3 is small and the angle of inclination of the stored article 50 is small, too, when the front-side suspension device 18 and the rear-side suspension device 19 are moved toward the front relative to the elastic member 17. A favorable storage state of the stored article 50 can thus be achieved in this case, too.

The following describes operation of the conveying apparatus 1 when the traveling structure 100 travels along an inclined road surface.

Figure 8:
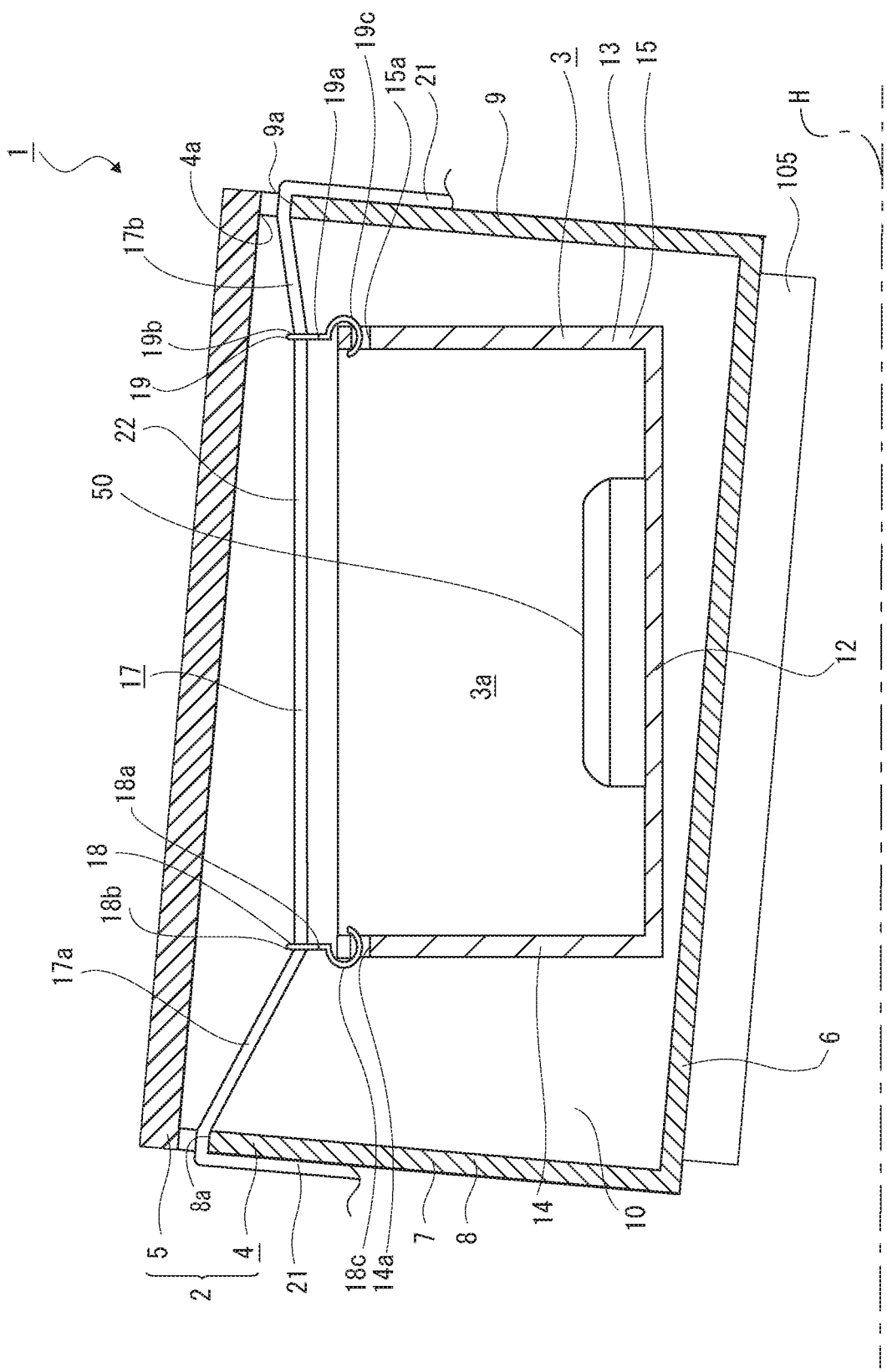
FIG. 8 is a cross-sectional view of the conveying apparatus when the traveling structure travels along an uphill.

Under a condition in which the traveling structure 100 travels along an uphill road, the outer casing 2 and the elastic members 17, 17 are brought into a state of being inclined downwardly toward the rear (see FIG. 8).

Thus, a force is exerted, by tare and weight of the storage case 3 and of the stored article 50, on the front-side suspension device 18 and the rear-side suspension device 19, which are slidably supported by the elastic member 17, to move the front-side suspension device 18 and the rear-side suspension device 19 toward the rear relative to the elastic member 17. A force is also exerted, by tare and weight of the stored article 50, on the suspended storage case 3 to move the storage case 3 toward the rear relative to the outer casing 2. At this time, a force is exerted in the vertical direction by gravity on the front-side suspension device 18, the rear-side suspension device 19, and the storage case 3.

Because the force is exerted on the front-side suspension device 18, the rear-side suspension device 19, and the storage case 3 to move the front-side suspension device 18, the rear-side suspension device 19, and the storage case 3 relatively toward the rear as described above, the front-side suspension device 18 and the rear-side suspension device 19 are slid by the elastic member 17 to move toward the rear and the storage case 3 is moved toward the rear in response to the movement of the front-side suspension device 18 and the rear-side suspension device 19. Because of the rear-side inclined portion 17b, which is inclined downwardly toward the front and which is included in the elastic member 17, and because of the friction force generated between each of the front-side suspension device 18 and the rear-side suspension device 19 and the elastic member 17, however, the front-side suspension device 18, the rear-side suspension device 19, and the storage case 3 are moved toward the rear relative to the elastic member 17 and the outer casing 2 over a predetermined range that corresponds to the angle of inclination of the road surface.

Because the front-side suspension device 18 and the rear-side suspension device 19 are moved toward the rear relative to the elastic member 17 at this time, the length of the front-side inclined portion 17a becomes long and the length of the rear-side inclined portion 17b becomes short. Additionally, because of the force exerted in the vertical direction by gravity on the storage case 3, a force is exerted on the storage case 3 in a direction to incline the storage case 3 downwardly toward the front relative to the outer casing 2. Thus, the weight of the storage case 3 and the stored article 50 causes the stretch amount of the front-side inclined portion 17a to increase and the stretch amount of the rear-side inclined portion 17b to decrease, so that the storage case 3 is not inclined and maintains the equilibrium state.

Because the storage case 3 maintains the equilibrium state even when the traveling structure 100 travels along an uphill road, the stored article 50 stored in the storage case 3 is not inclined inside the storage case 3 and a favorable storage state of the stored article 50 can be achieved.

Figure 9:
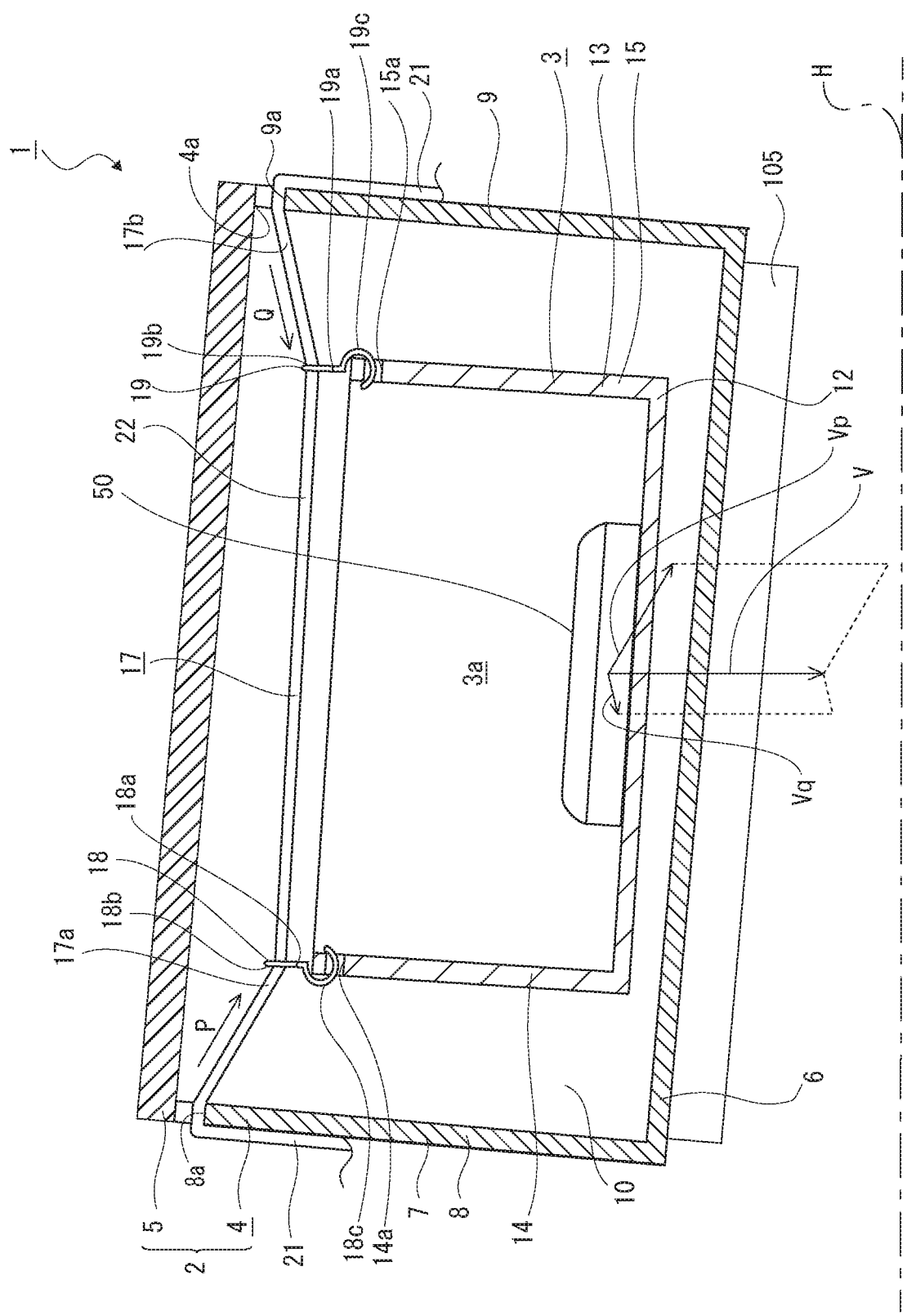
FIG. 9 is a cross-sectional view of the conveying apparatus when a suspension device does not slide relative to an elastic member while the traveling structure is traveling along an uphill.

It is noted that the front-side suspension device 18 and the rear-side suspension device 19 may not be moved toward the rear because the movement of the front-side suspension device 18 and the rear-side suspension device 19 toward the rear is restricted by the friction force between each of the front-side suspension device 18 and the rear-side suspension device 19 and the elastic member 17 or the restriction force of the rear-side inclined portion 17b under the condition in which the traveling structure 100 travels along the uphill road (see FIG. 9).

A force in a vertical direction V is exerted by gravity on the storage case 3 even under the above case. At this time, the front-side inclined portion 17a is stretched in a direction P, which extends obliquely downwardly toward the rear and the rear-side inclined portion 17b is stretched in a direction Q, which extends obliquely downwardly toward the front.

With the force exerted at this time on the storage case 3 in the vertical direction V, a component Vp acting in the direction in which the front-side inclined portion 17a is stretched is set to be greater than a component Vq acting in the direction in which the rear-side inclined portion 17b is stretched. Thus, the front-side inclined portion 17a is stretched by the component Vp more than the rear-side inclined portion 17b, so that the storage case 3 is inclined downwardly toward the front to a position close to the equilibrium state.

Thus, the storage case 3 is not likely to be inclined greatly relative to the equilibrium state and maintains a state close to the equilibrium state.

As such, the storage case 3 maintains a state close to the equilibrium state even when the front-side suspension device 18 and the rear-side suspension device 19 are not moved toward the rear as the traveling structure 100 travels along an uphill road. Thus, the stored article 50 stored in the storage case 3 is not inclined greatly inside the storage case 3, so that a favorable storage state of the stored article 50 is achieved.

Figure 10:
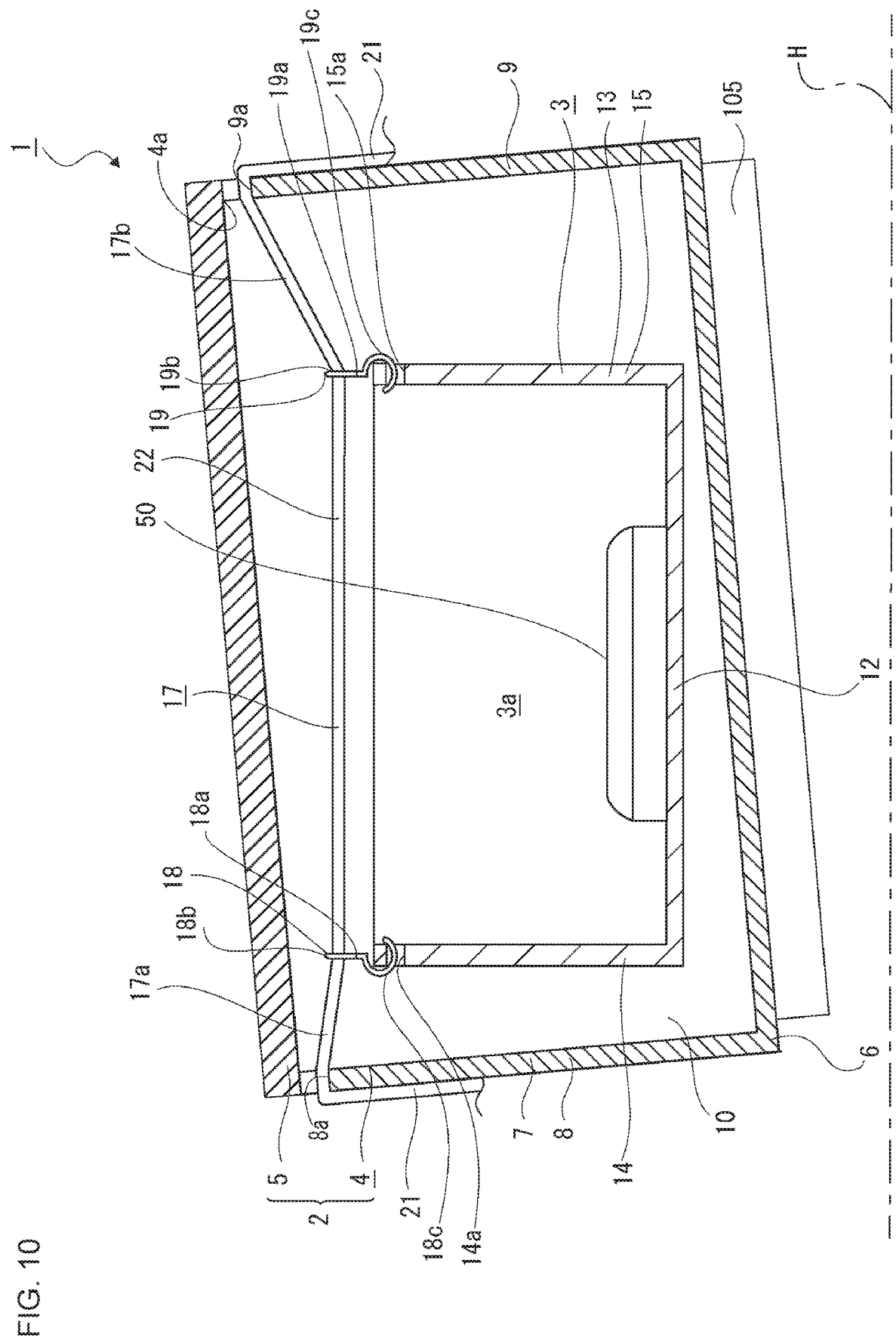
FIG. 10 is a cross-sectional view of the conveying apparatus when the traveling structure travels along a downhill.
Figure 11:
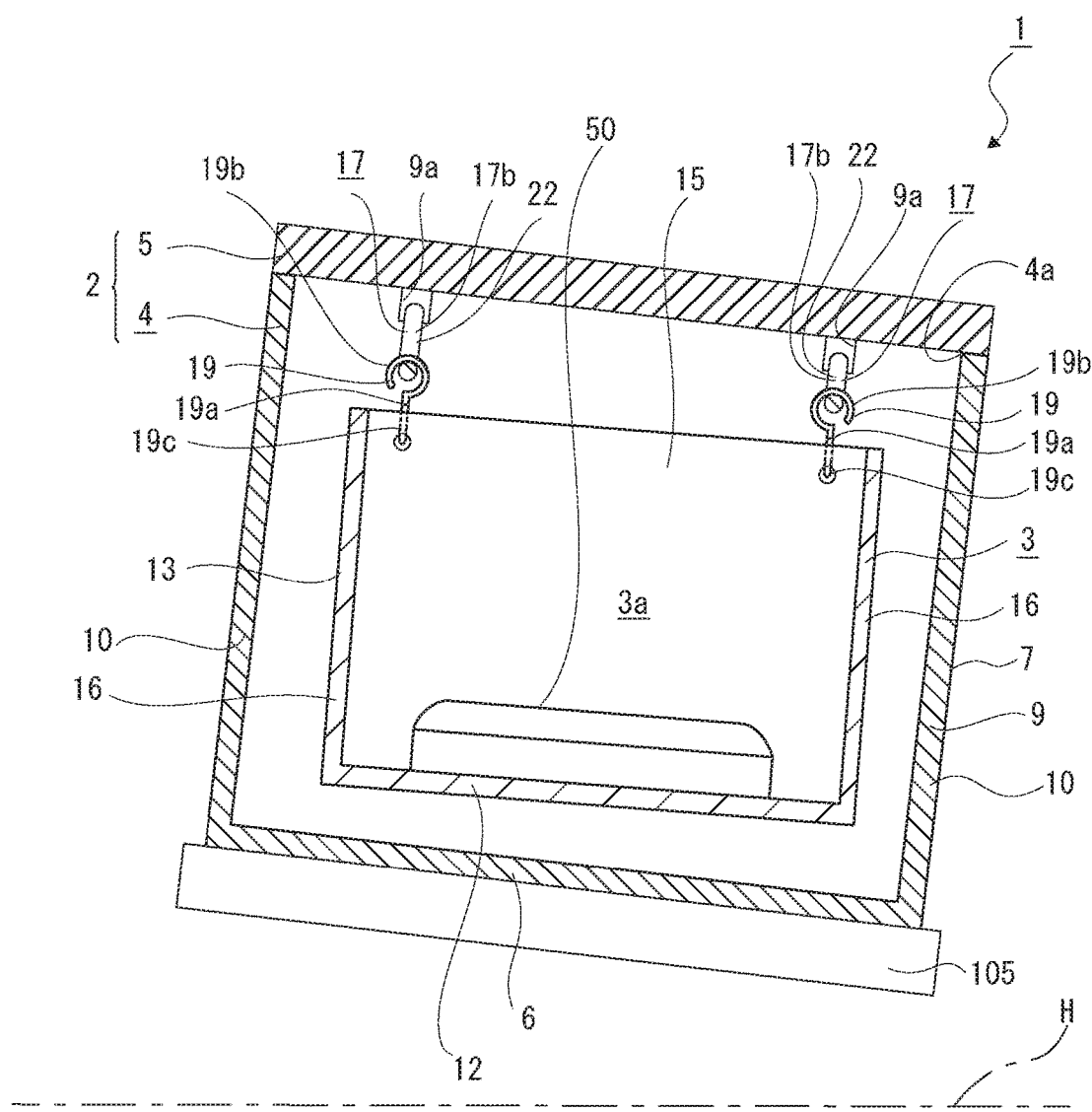
FIG. 11 is a cross-sectional view of the conveying apparatus as viewed from a rear when the traveling structure is inclined in the crosswise direction.
Figure 12:
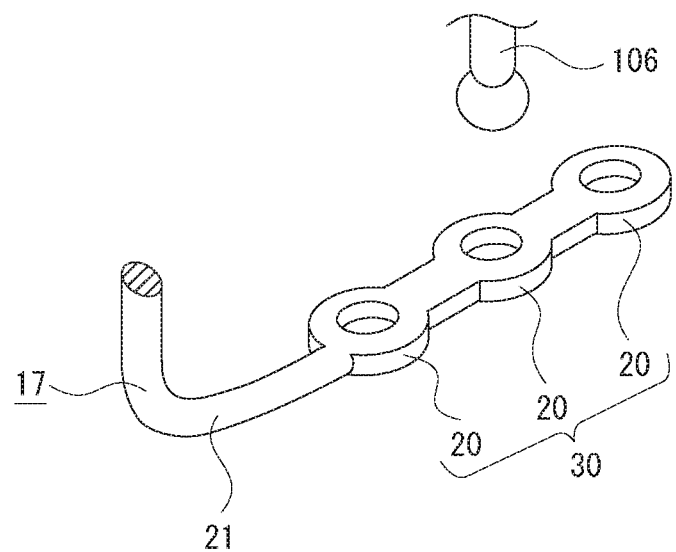
FIG. 12 depicts, as with FIGS. 13 to 16, an example of a tension adjustment structure, FIG. 12 being a perspective view of one example of the tension adjustment structure.
Figure 13:
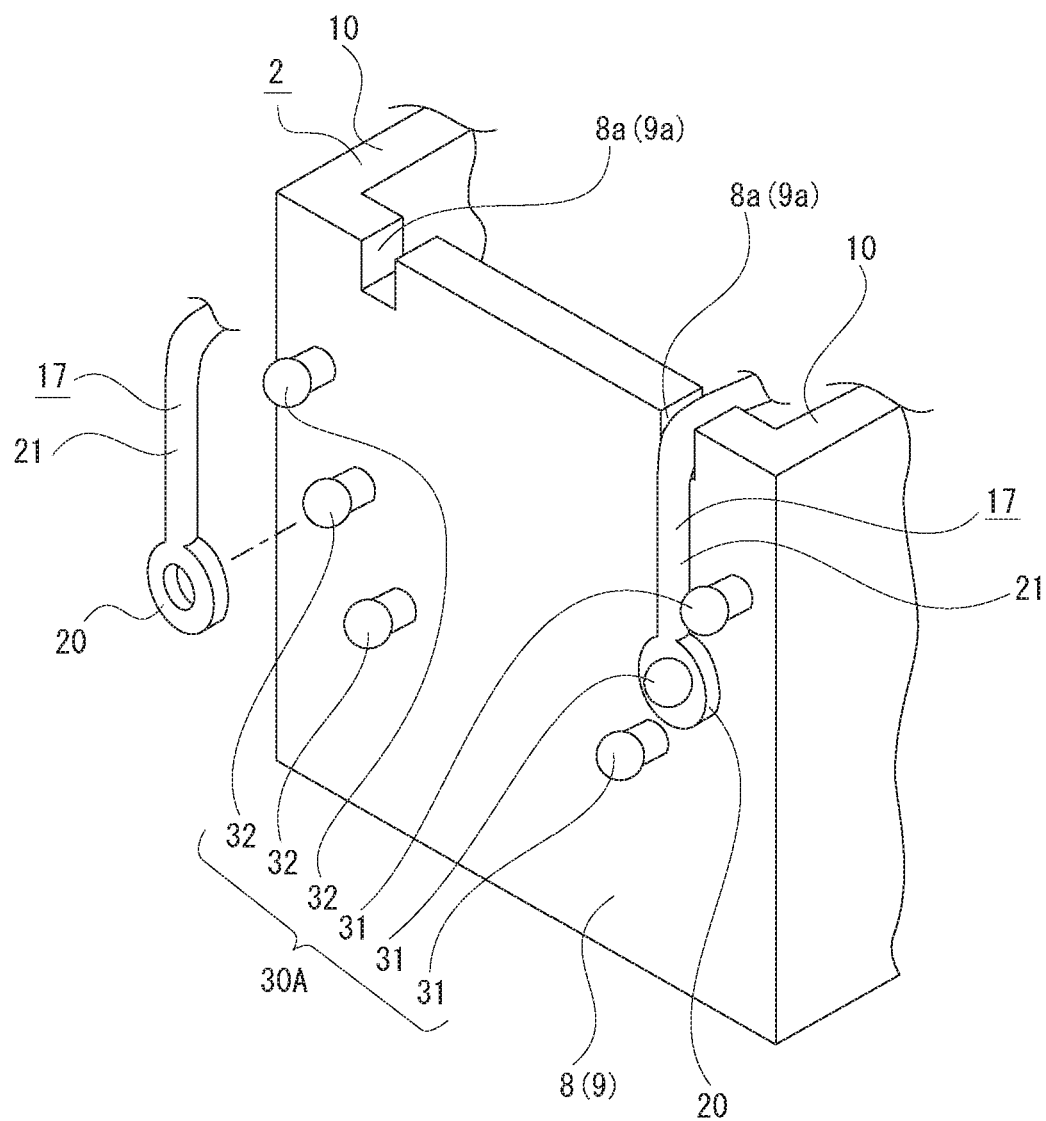
FIG. 13 is a perspective view of another example of the tension adjustment structure.
Figure 14:
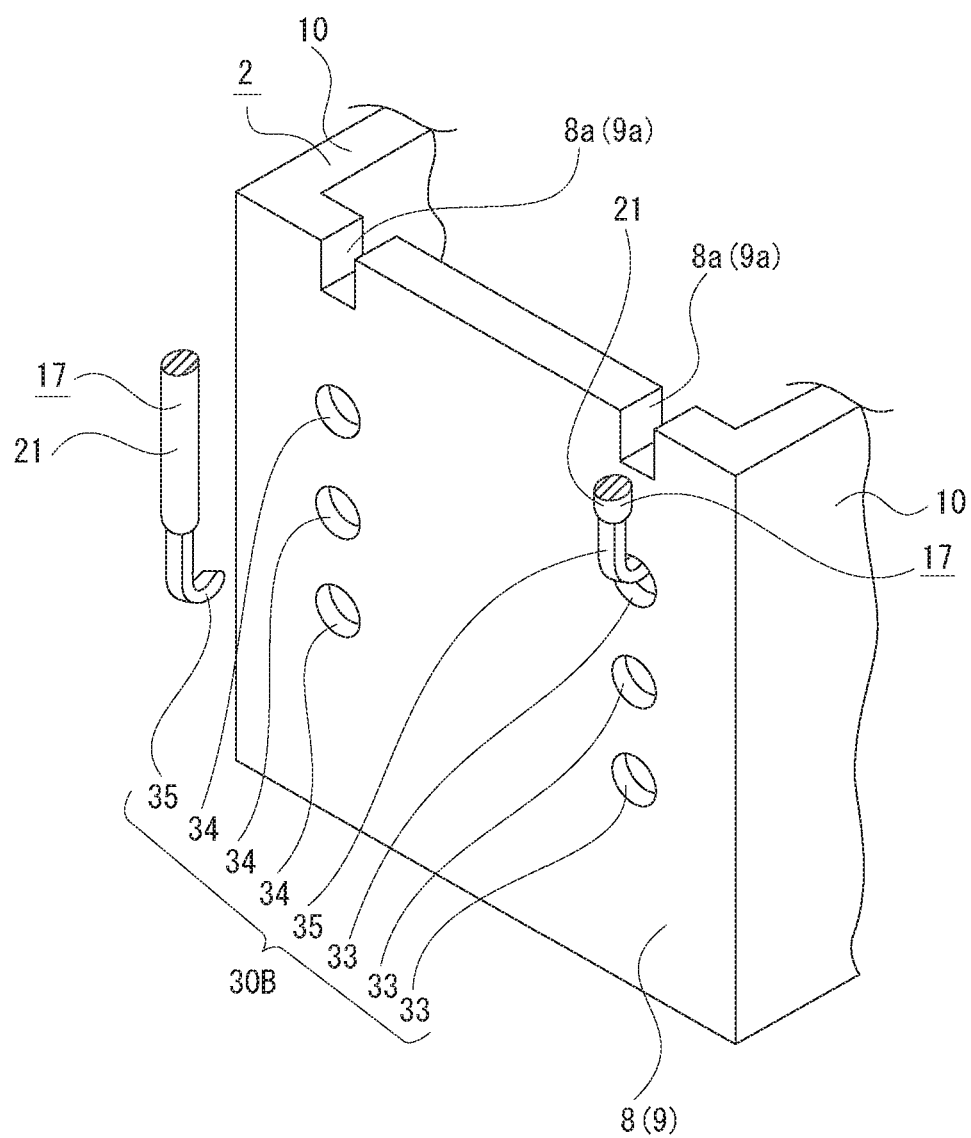
FIG. 14 is a perspective view of still another example of the tension adjustment structure.
Figure 15:
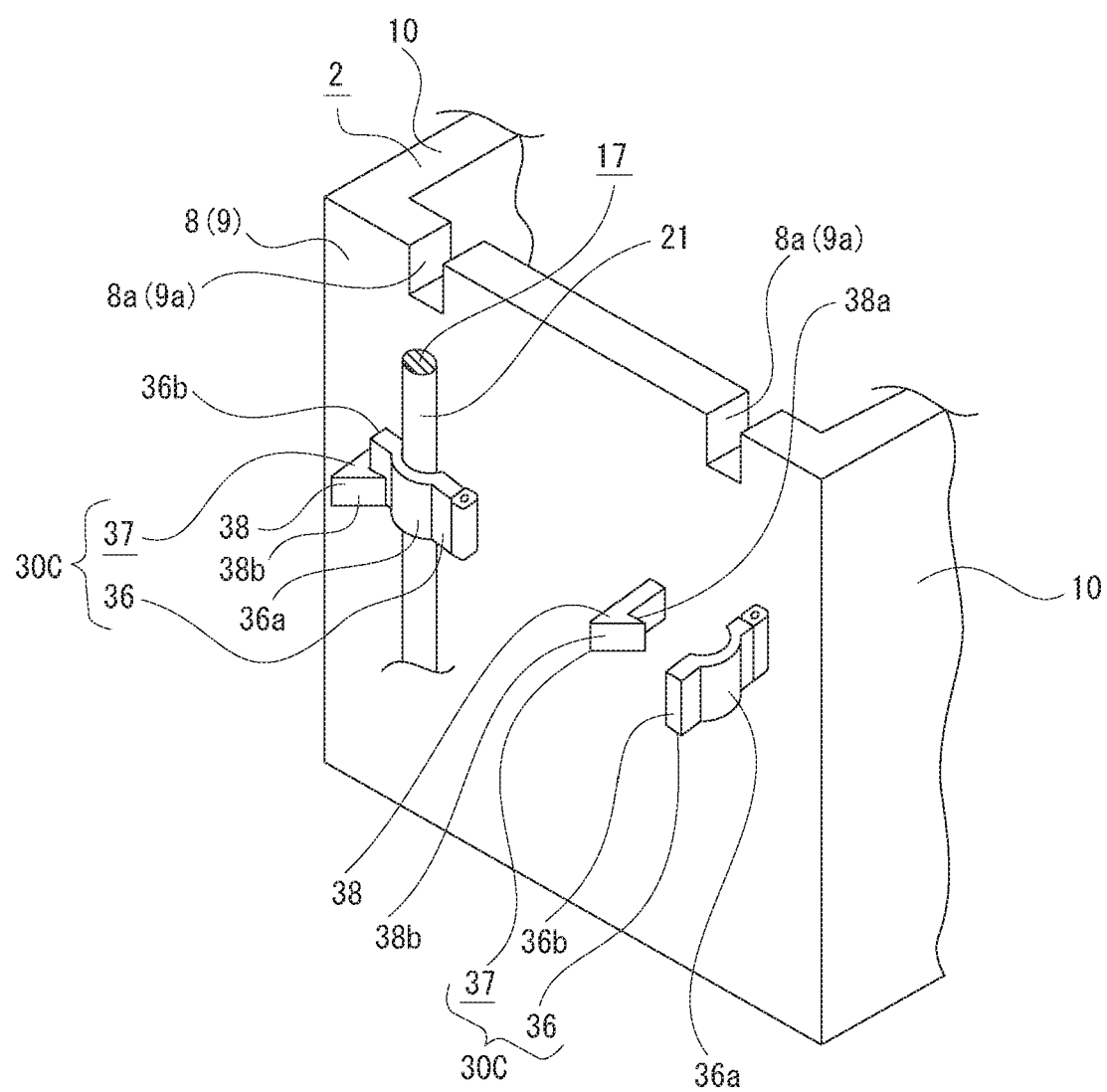
FIG. 15 depicts, as with FIG. 16, a further example of the tension adjustment structure, FIG. 15 being a perspective view of the example of the tension adjustment structure.
Figure 16:
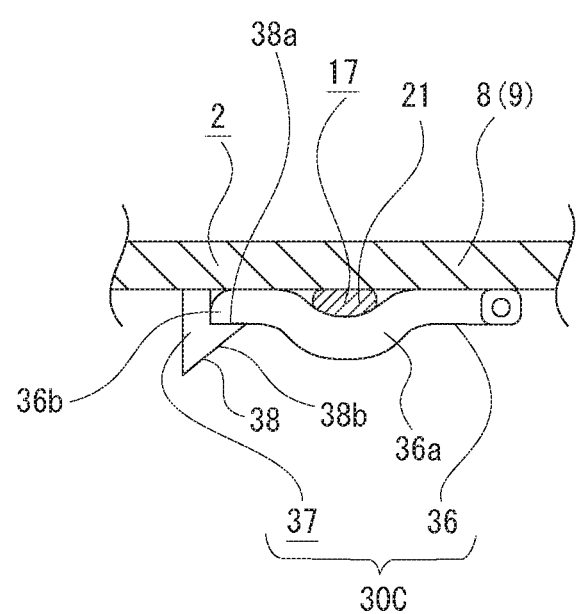
FIG. 16 is a plan view including a partial cross-sectional view of a condition in which the elastic member is held by the tension adjustment structure.

Under a condition in which the traveling structure 100 travels along a downhill, the outer casing 2 and the elastic members 17, 17 are brought into a state of being inclined downwardly toward the front (see FIG. 10).

Thus, a force is exerted, by tare and weight of the storage case 3 and of the stored article 50, on the front-side suspension device 18 and the rear-side suspension device 19, which are slidably supported by the elastic member 17, to move the front-side suspension device 18 and the rear-side suspension device 19 toward the front relative to the elastic member 17. A force is also exerted, by tare and weight of the stored article 50, on the suspended storage case 3 to move the storage case 3 toward the front relative to the outer casing 2. At this time, a force is exerted in the vertical direction by gravity on the front-side suspension device 18, the rear-side suspension device 19, and the storage case 3.

Because the force is exerted on the front-side suspension device 18, the rear-side suspension device 19, and the storage case 3 to move the front-side suspension device 18, the rear-side suspension device 19, and the storage case 3 relatively toward the front as described above, the front-side suspension device 18 and the rear-side suspension device 19 are slid by the elastic member 17 to move toward the front and the storage case 3 is moved toward the front in response to the movement of the front-side suspension device 18 and the rear-side suspension device 19. Because of the front-side inclined portion 17a, which is inclined downwardly toward the rear and which is included in the elastic member 17, and because of the friction force generated between each of the front-side suspension device 18 and the rear-side suspension device 19 and the elastic member 17, however, the front-side suspension device 18, the rear-side suspension device 19, and the storage case 3 are moved toward the front relative to the elastic member 17 and the outer casing 2 over a predetermined range that corresponds to the angle of inclination of the road surface.

Because the front-side suspension device 18 and the rear-side suspension device 19 are moved toward the front relative to the elastic member 17 at this time, the length of the rear-side inclined portion 17b becomes long and the length of the front-side inclined portion 17a becomes short. Additionally, because of the force exerted in the vertical direction by gravity on the storage case 3, a force is exerted on the storage case 3 in a direction to incline the storage case 3 downwardly toward the rear relative to the outer casing 2. Thus, the weight of the storage case 3 and the stored article 50 causes the stretch amount of the rear-side inclined portion 17b to increase and the stretch amount of the front-side inclined portion 17a to decrease, so that the storage case 3 is not inclined and maintains the equilibrium state.

Because the storage case 3 maintains the equilibrium state even when the traveling structure 100 travels along a downhill road, the stored article 50 stored in the storage case 3 is not inclined inside the storage case 3 and a favorable storage state of the stored article 50 can be achieved.

It is noted that the front-side suspension device 18 and the rear-side suspension device 19 may not be moved toward the front because the movement of the front-side suspension device 18 and the rear-side suspension device 19 toward the front is restricted by the friction force between each of the front-side suspension device 18 and the rear-side suspension device 19 and the elastic member 17 or the restriction force of the front-side inclined portion 17a under the condition in which the traveling structure 100 travels along the downhill road.

A force in the vertical direction is exerted by gravity on the storage case 3 in this case, too. In contrast to the case in which the front-side suspension device 18 and the rear-side suspension device 19 are not moved toward the rear when the traveling structure 100 travels along the uphill road, the component acting in the direction in which the rear-side inclined portion 17b is stretched is set to be greater than the component acting in the direction in which the front-side inclined portion 17a is stretched. Thus, the rear-side inclined portion 17b is stretched more than the front-side inclined portion 17a by the component of force exerted on the storage case 3 in the vertical direction, so that the storage case 3 is inclined downwardly toward the rear to a position close to the equilibrium state.

Thus, the storage case 3 is not likely to be inclined greatly relative to the equilibrium state and maintains a state close to the equilibrium state.

As such, the storage case 3 maintains a state close to the equilibrium state even when the front-side suspension device 18 and the rear-side suspension device 19 are not moved toward the front as the traveling structure 100 travels along a downhill road. Thus, the stored article 50 stored in the storage case 3 is not inclined greatly inside the storage case 3, so that a favorable storage state of the stored article 50 is achieved.

It is noted that the traveling structure 100 may be decelerated or accelerated while traveling along an uphill or downhill road. In such a case, the operation during deceleration or the operation during acceleration described above is performed under a condition in which the storage case 3 maintains the equilibrium state on the uphill or downhill road, to thereby ensure that the storage case 3 maintains the equilibrium state or a state close to the equilibrium state. Thus, the description of the operation of the conveying apparatus 1 when the traveling structure 100 is decelerated or accelerated while traveling along an uphill or downhill road is omitted.

The following describes operation of the conveying apparatus 1 when the traveling structure 100 inclines in the crosswise direction while, for example, making a right turn or a left turn. The operation of the conveying apparatus 1 is reversed between a leftward inclination and a rightward inclination. Thus, the following illustrates as an example the operation when the traveling structure 100 inclines to the right relative to a traveling direction (see FIG. 11).

When the traveling structure 100 inclines to the right, the outer casing 2 and the elastic members 17, 17 are brought into a state of being inclined to the right.

Thus, a force is exerted on the front-side suspension device 18 and the rear-side suspension device 19, which are rockably supported by the elastic member 17, to rock the front-side suspension device 18 and the rear-side suspension device 19 in the vertical direction (gravitational direction) by tare and weight of the storage case 3 and the stored article 50. A force is also exerted on the suspended storage case 3 to rock the storage case 3 in the vertical direction by tare and weight of the stored article 50.

Because the force is exerted on the front-side suspension device 18, the rear-side suspension device 19, and the storage case 3 to rock the front-side suspension device 18, the rear-side suspension device 19, and the storage case 3 in the vertical direction as described above, the front-side suspension device 18, the rear-side suspension device 19, and the storage case 3 are pivotally rocked in the vertical direction about the supported portion 18b and the supported portion 19b relative to the outer casing 2 and the elastic member 17.

The elastic member 17 on the left-hand side is located superior to the elastic member 17 on the right-hand side at this time, the storage case 3, which is rocked in the vertical direction, is brought into a state of being inclined upwardly toward the left. Because of the force exerted on the storage case 3 to rock the storage case 3 in the vertical direction, however, a force exerted from the storage case 3 via the front-side suspension device 18 and the rear-side suspension device 19 on the elastic member 17 on the left-hand side located at a higher position is greater than a force exerted from the storage case 3 via the front-side suspension device 18 and the rear-side suspension device 19 on the elastic member 17 on the right-hand side located at a lower position. Thus, the elastic member 17 on the left-hand side is stretched more than the elastic member 17 on the right-hand side, so that the storage case 3 is inclined downwardly toward the left to a position close to the equilibrium state.

Thus, the storage case 3 is not inclined greatly relative to the vertical direction and maintains a state close to the equilibrium state.

As described above, the storage case 3 maintains a state close to the equilibrium state when the traveling structure 100 is inclined in the crosswise direction. Thus, the stored article 50 stored in the storage case 3 is not inclined greatly inside the storage case 3 and a favorable storage state of the stored article 50 is achieved.

It is noted that the traveling structure 100, when in a state of being inclined in the crosswise direction, may be decelerated or accelerated. In such a case, the operation during deceleration or the operation during acceleration described above is performed under a condition in which the storage case 3 is inclined in the crosswise direction and maintains the equilibrium state, to thereby ensure that the storage case 3 maintains the equilibrium state or a state close to the equilibrium state. Thus, the description of the operation of the conveying apparatus 1 when the traveling structure 100 in a state of being inclined in the crosswise direction is decelerated or accelerated is omitted.

In addition, the traveling structure 100, when in a state of being inclined in the crosswise direction, may travel along an uphill or downhill road. In such a case, the operation during traveling along the uphill or downhill road described above is performed under a condition in which the storage case 3 is inclined in the crosswise direction and maintains the equilibrium state, to thereby ensure that the storage case 3 maintains the equilibrium state or a state close to the equilibrium state. Thus, the description of the operation of the conveying apparatus 1 when the traveling structure 100, in the state of being inclined in the crosswise direction, travels along the uphill or downhill road is omitted.

<Tension Adjustment Structure>

The following describes a tension adjustment structure (see FIGS. 12 to 16).

The conveying apparatus 1 may be provided with a tension adjustment structure that adjust tension of the elastic members 17, 17 to a required tension value.

The tension adjustment structure, when provided, allows a position at which the storage case 3 is suspended with respect to the outer casing 2 and the state of the elastic member 17 being stretched while the traveling structure 100 is traveling to be varied through adjustment of tension of the elastic member 17.

Thus, the inclination of the storage case 3 relative to the vertical direction can be reduced regardless of differences in conditions including weight of the stored article 50, weight of the storage case 3, positions of the elastic members 17, 17 relative to the outer casing 2 or the storage case 3, and the size of the storage case 3 relative to the outer casing 2.

The following describes tension adjustment structures 30, 30A, 30B, and 30C having configurations different from each other.

The tension adjustment structure 30 is configured so as to include a plurality of attached portions 20, 20, . . . . The attached portions 20, 20 are included in the elastic member 17 and spaced apart from each other or disposed continuously in the longitudinal direction (see FIG. 12).

With the tension adjustment structure 30, any specific attached portion 20 is mounted on the mounting protrusion 106, which is disposed on the cargo deck 104 of the traveling structure 100. The stretch amount of the elastic member 17 is thereby varied and tension in the elastic member 17 can be adjusted.

A tension adjustment structure 30A includes a plurality of protrusions 31, 31, . . . and a plurality of protrusions 32, 32, . . . . The protrusions 31, 31, . . . and the protrusions 32, 32, . . . protrude outwardly from at least either one of the front surface panel portion 8 and the rear surface panel portion 9 of the outer casing 2. The protrusions 31, 31, . . . are spaced apart vertically from each other and the protrusions 32, 32, . . . are spaced apart vertically from each other (see FIG. 13).

The protrusions 31, 31, . . . and the protrusions 32, 32, . . . are disposed to be spaced apart from each other in the crosswise direction. The protrusions 31, 31, . . . are disposed at positions different from each other in the crosswise direction. The protrusions 32, 32, . . . are also disposed at positions different from each other in the crosswise direction, as with the protrusions 31, 31, . . . .

With the tension adjustment structure 30A, the attached portion 20 of a first elastic member 17 is attached on any specific protrusion 31 and the attached portion 20 of a second elastic member 17 is attached on any specific protrusion 32. The stretch amounts of the elastic members 17, 17 are thereby varied, so that tension in the elastic member 17 can be adjusted.

In the tension adjustment structure 30A, the protrusions 31, 31, . . . and the protrusions 32, 32, . . . are disposed at positions different from each other in the crosswise direction. It is noted that, when the attached portions 20, 20 are mounted on any protrusions 31 and 32 other than the uppermost protrusions 31 and 32, the elastic member 17 does not interfere with the protrusions 31 and 32 disposed superior to the protrusions 31 and 32 on which the attached portions 20, 20 are mounted. This facilitates mounting of the elastic member 17 on the protrusions 31 and 32 and achieves a steady mounting condition of the elastic member 17 with respect to the protrusions 31 and 32.

Additionally, when the tension adjustment structure 30A is employed, the side on which the attached portion 20 is not mounted on the mounting protrusion 106 is mounted on the cargo deck 104 of the conveying apparatus 1 by any device other than the elastic member 17.

A tension adjustment structure 30B has a plurality of mounting holes 33, 33, . . . and a plurality of mounting holes 34, 34, . . . . The mounting holes 33, 33, . . . and the mounting holes 34, 34, are formed in at least either one of the front surface panel portion 8 and the rear surface panel portion 9 of the outer casing 2. The mounting holes 33, 33, . . . are spaced apart vertically from each other and the mounting holes 34, 34, . . . are spaced apart vertically from each other. At least one end of each of the elastic members 17, 17 has a mounting bracket 35. The mounting bracket 35 is connected with the end of each of the elastic members 17, 17 and has a distal end bent (see FIG. 14).

The mounting holes 33, 33, . . . are spaced apart from the mounting holes 34, 34, . . . in the crosswise direction.

In the tension adjustment structure 30B, the mounting bracket 35 of a first one of the elastic members 17, 17 is inserted in any specific one of the mounting holes 33, 33, . . . and the mounting bracket 35 of a second one of the elastic members 17, 17 is inserted in any specific one of the mounting holes 34, 34, . . . . Stretch amounts of the elastic members 17, 17 are thereby varied, so that tension in the elastic members 17, 17 can be adjusted.

It is noted that, when the tension adjustment structure 30B is employed, the side on which the attached portion 20 is not mounted on the mounting protrusion 106 is mounted on the cargo deck 104 of the conveying apparatus 1 by any device other than the elastic member 17.

A tension adjustment structure 30C is configured to include mounting members 36, 36 and locking portions 37, 37. The mounting members 36, 36 and the locking portions 37, 37 are disposed on at least either one of the front surface panel portion 8 and the rear surface panel portion 9 of the outer casing 2. The mounting members 36, 36 are spaced apart from each other in the crosswise direction. The locking portions 37, 37 are disposed close to the respective mounting members 36, 36 (see FIGS. 15 and 16).

The mounting member 36 is supported on the front surface panel portion 8 or the rear surface panel portion 9 so as to be pivotally rotatable about a left end or a right end thereof. The mounting member 36 includes a holding portion 36a at a center thereof. The holding portion 36a is formed into, for example, a curved surface protruding outwardly.

The locking portion 37 is elastically deformable with respect to the front surface panel portion 8 or the rear surface panel portion 9. The locking portion 37 includes a lock tab 38 disposed at a distal end thereof. The lock tab 38 has a lock surface 38a and an inclined surface 38b. The lock surface 38a faces the front surface panel portion 8 or the rear surface panel portion 9. The inclined surface 38b joins the lock surface 38a.

In the tension adjustment structure 30C, the mounting member 36 is rotated in a direction in which the mounting member 36 is closed from a condition in which the mounting member 36 is open with respect to the front surface panel portion 8 or the rear surface panel portion 9, the extended portion 21 of the elastic member 17 is pressed by the holding portion 36a from the outside, and a distal end portion 36b of the mounting member 36 is locked by the locking portion 37. The elastic member 17 is thereby held by the mounting member 36 and mounted on the outer casing 2.

The mounting member 36 is locked in the locking portion 37 as follows. Specifically, the distal end portion 36b of the rotated mounting member 36 slides over the inclined surface 38b to thereby cause the locking portion 37 to be elastically deformed. Further rotating the mounting member 36 causes the distal end portion 36b to ride over the inclined surface 38b. Then, the locking portion 37 elastically restores to an original shape to thereby bring the lock surface 38a into locking engagement with an outer surface of the distal end portion 36b.

Under a condition in which the mounting member 36 is locked in the locking portion 37 and the elastic member 17 is held by the mounting member 36 to be mounted on the outer casing 2, the extended portion 21 is clamped between, and crushed by, the front surface panel portion 8 or the rear surface panel portion 9 and the holding portion 36a of the mounting member 36.

The stretch amount of the elastic member 17 is varied depending on a position at which the extended portion 21 of the elastic member 17 is held by the holding portion 36a, so that tension in the elastic member 17 can be adjusted.

It is noted that, when the tension adjustment structure 30C is employed, the attached portion 20 may be mounted on the mounting protrusion 106 to thereby be mounted on the cargo deck 104 of the conveying apparatus 1.

<Miscellaneous>

The following describes examples of other possible configurations of different parts.

Figure 17:
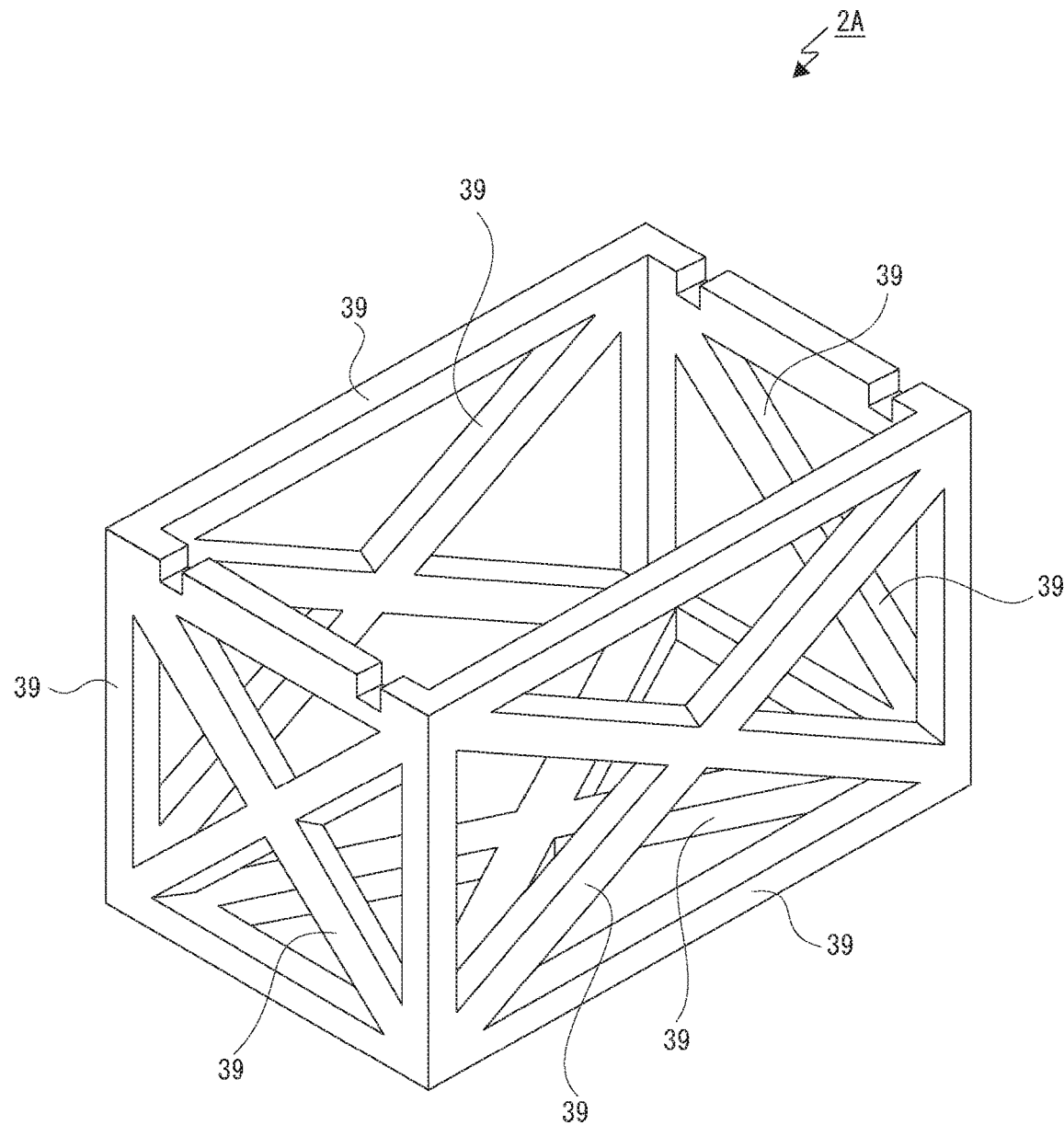
FIG. 17 is a perspective view of another configuration example of an outer casing.

The foregoing has been described for a case in which the box-shaped outer casing 2 is open upwardly. Instead of the outer casing 2, an outer casing 2A having a skeleton structure may be employed (see FIG. 17). The outer casing 2A includes a plurality of columnar members 39, 39, . . . and has a skeleton structure opening upwardly.

The use of the outer casing 2A having the skeleton structure enables reduction in weight of the conveying apparatus 1. In addition, the use of the outer casing 2A allows vehicle traveling wind and natural wind to blow against the storage case 3 disposed inside through clearances in the columnar members 39, 39, . . . . This makes the configuration preferable for a case in which, for example, the stored article 50 stored in the storage case 3 needs cooling.

It is noted that the skeleton structure may be employed for the storage case 3 in order, for example, to achieve reduction in weight.

Figure 18:
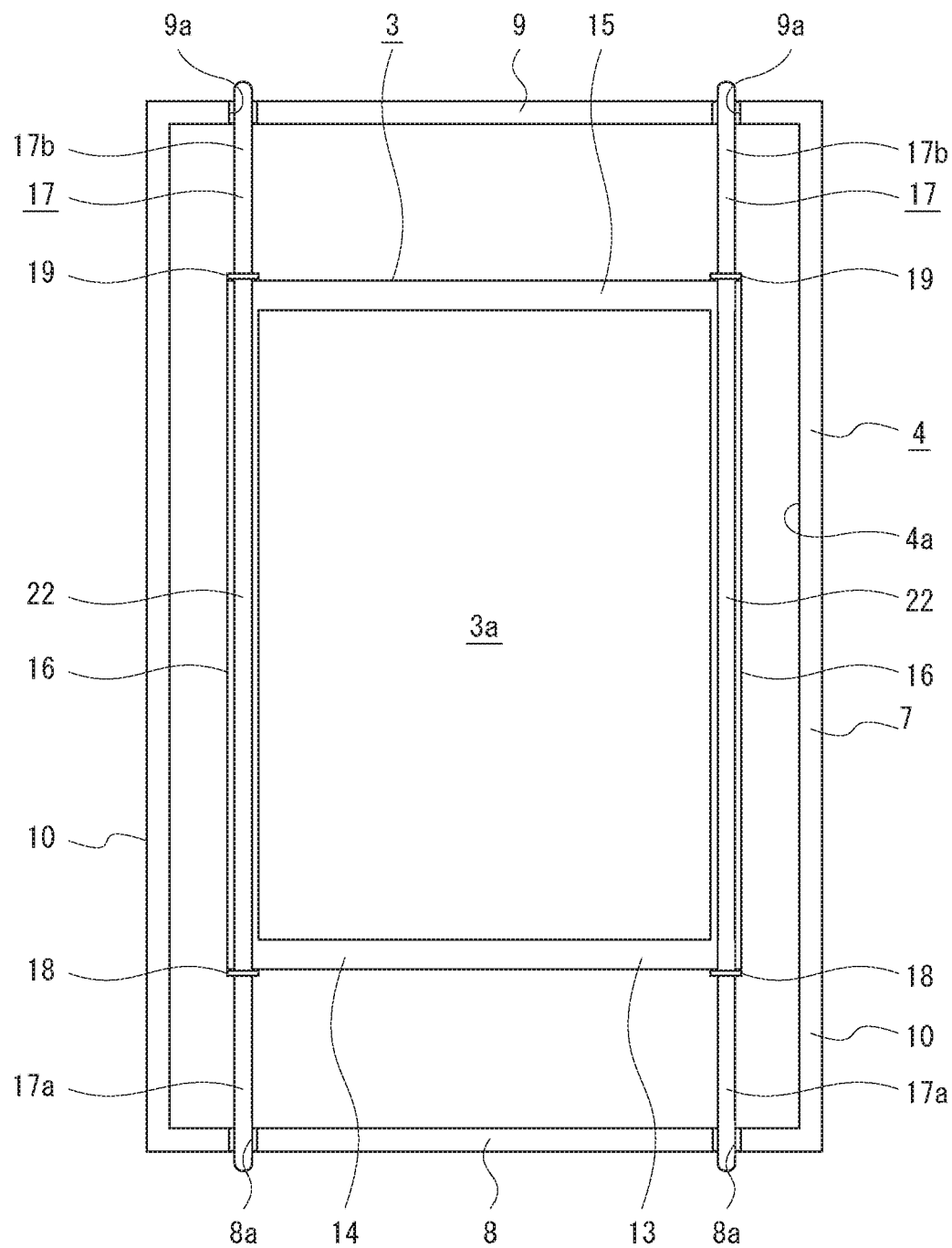
FIG. 18 is a plan view depicting a condition in which bridging portions of the elastic members are disposed at positions immediately above both ends in the crosswise direction of a suspended storage case.

Under a condition in which the storage case 3 is suspended, preferably, the bridging portions 22, 22 of the elastic members 17, 17 are disposed at positions immediately above both ends in the crosswise direction, respectively, of the storage case 3 (see FIG. 18).

The disposition of the bridging portions 22, 22 at the positions immediately above both ends in the crosswise direction, respectively, of the storage case 3 under the condition in which the storage case 3 is suspended increases the distance between the elastic members 17, 17. The storage case 3 is thus held in a steady state and is hard to incline. A steady suspended state can thus be achieved for the storage case 3 by reducing inclination relative to the storage case 3.

Additionally, because the elastic members 17, 17 are less likely to interfere with the stored article 50 that is placed in and removed from the storage space 3a, insertion and removal of the stored article 50 in and from the storage space 3a can be smoothly performed.

It is noted that, in this case, the storage case 3 may be configured such that the front surface portion 14 and the rear surface portion 15 are supported by the front-side suspension devices 18, 18 and the rear-side suspension devices 19, 19, respectively, and the supported holes may be formed in the side surface portions 16, 16 and the side surface portions 16, 16 may then be supported by the front-side suspension devices 18, 18 and the rear-side suspension devices 19, 19, respectively.

Figure 19:
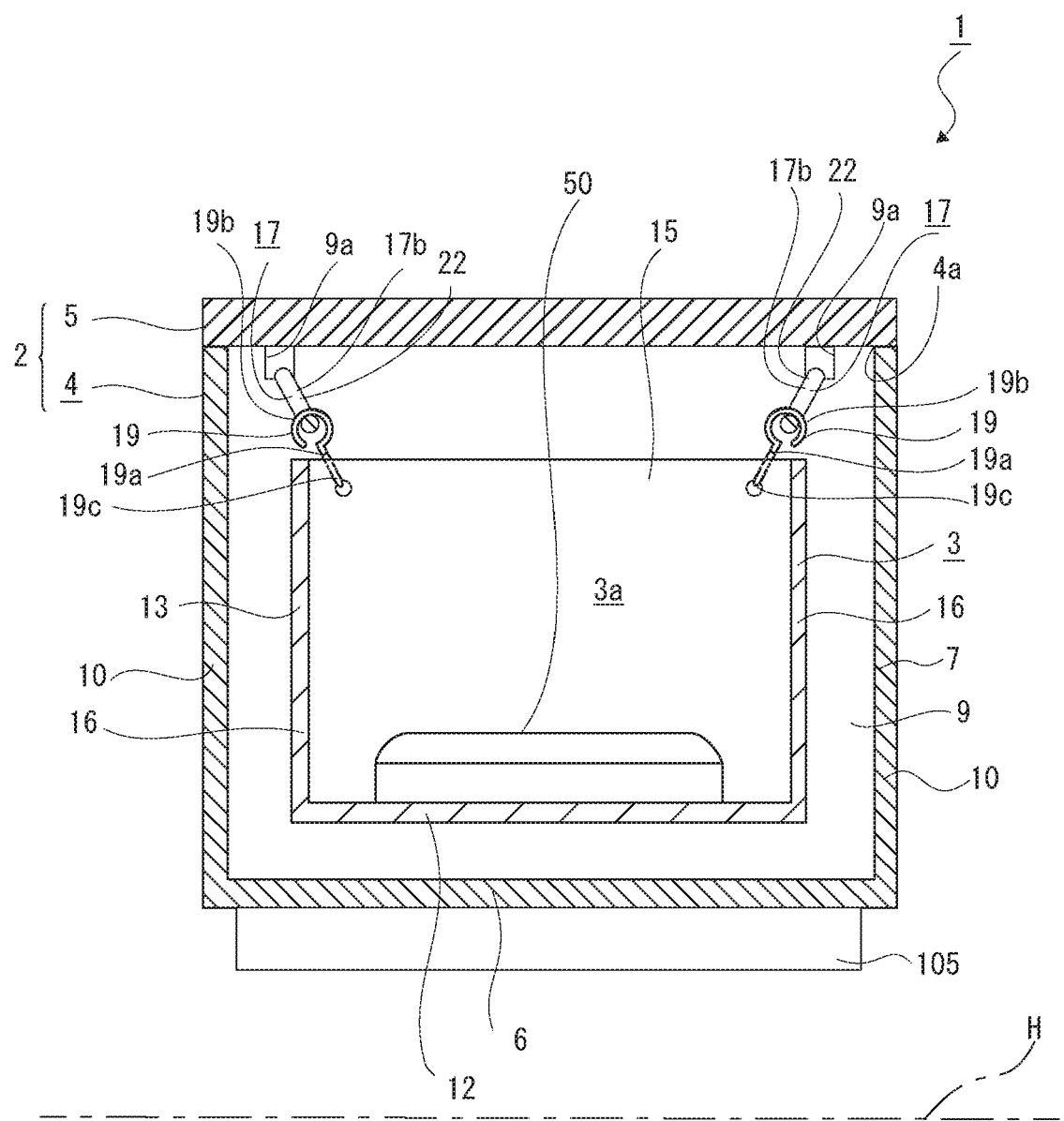
FIG. 19 is a cross-sectional view depicting a condition in which the bridging portions of the elastic members are disposed at positions outside both ends in the crosswise direction of a suspended storage case.

Alternatively, under the condition in which the storage case 3 is suspended, the bridging portions 22, 22 of the elastic members 17, 17 are disposed at positions outside both ends in the crosswise direction, respectively, of the storage case 3 (see FIG. 19).

The disposition of the bridging portions 22, 22 at the positions outside both ends in the crosswise direction, respectively, of the storage case 3 under the condition in which the storage case 3 is suspended causes tensile forces of the elastic members 17, 17 to be exerted on the storage case 3 in the crosswise direction. This prevents the storage case 3 from being deviated in the crosswise direction relative to the outer casing 2 and enables holding of the storage case 3 in a steady state.

Figure 20:
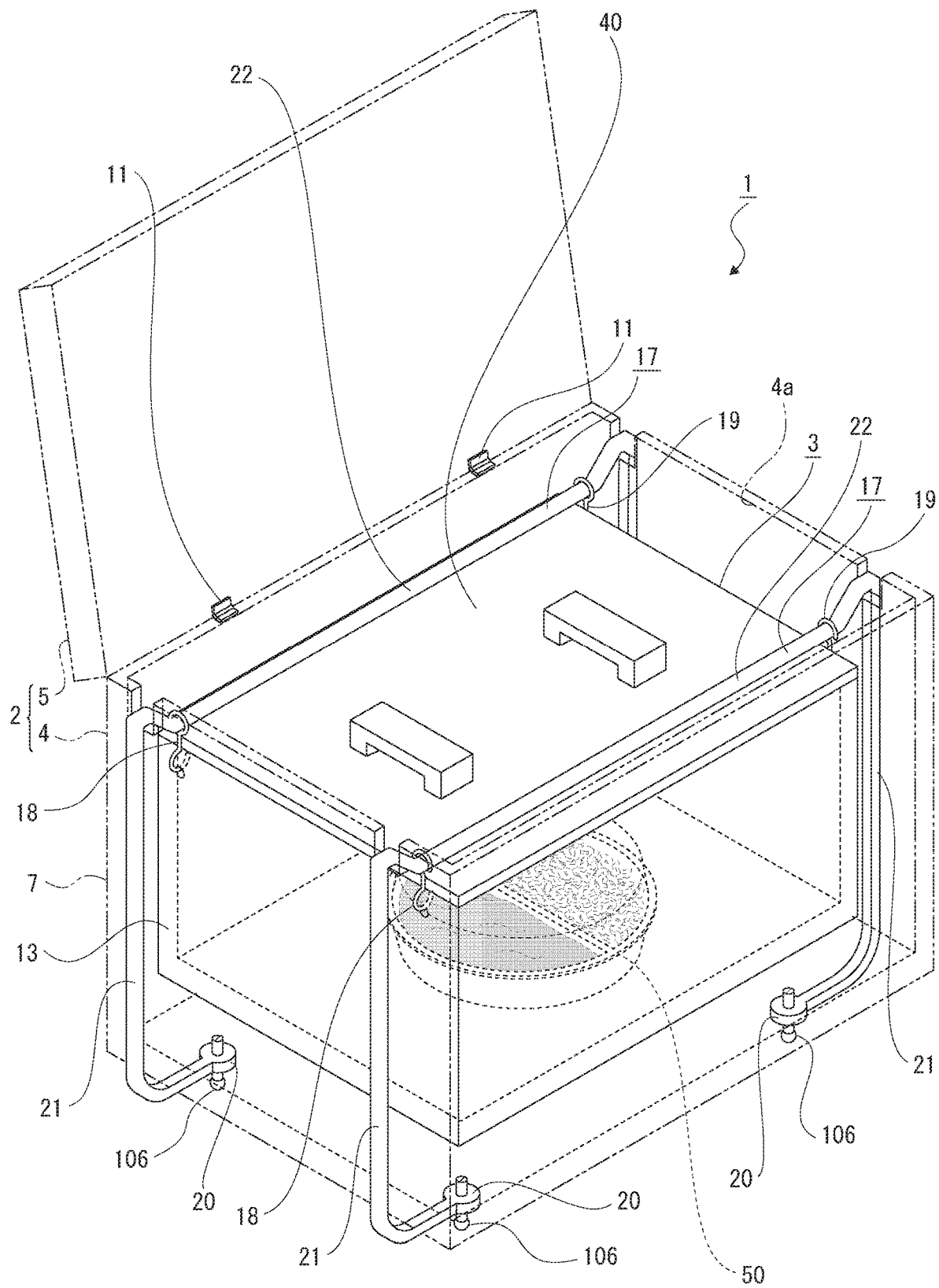
FIG. 20 is a perspective view of an example of a configuration including a lid member that opens or closes an opening in the storage case.

Additionally, the conveying apparatus 1 may further include a lid member 40. The lid member 40 closes or opens an opening in the storage case 3 (see FIG. 20). The lid member 40 may be removable from the storage case 3 or supported by the storage case 3.

The lid member 40 provided for opening or closing the opening in the storage case 3 improves a heat-retaining property when, for example, the stored article 50 stored in the storage space 3a is food and prevents entry of dust, dirt, and rainwater, for example, in the storage space 3a of the storage case 3.

The foregoing has been described for a case in which the front-side suspension device 18 and the rear-side suspension device 19 include the connecting portions 18a and 19a, respectively. For the front-side suspension device and the rear-side suspension device, an S-shaped hook including a continuous arcuate portion may, for example, be used.

Figure 21:
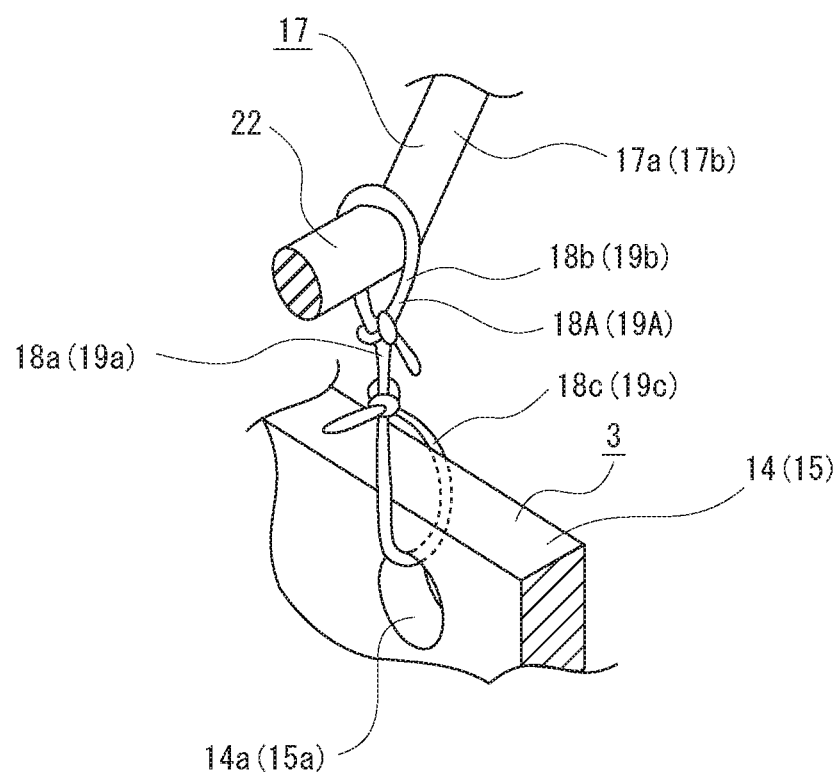
FIG. 21 is a perspective view of an example of a configuration in which the storage case is suspended by strap-shaped members.

Still alternatively, a strap-shaped front-side suspension device 18A and a strap-shaped rear-side suspension device 19A may be used (see FIG. 21). The use of the strap-shaped front-side suspension device 18A and rear-side suspension device 19A allows a length and a size of connecting portions 18a and 19a, supported portions 18b and 19b, and supporting portions 18c and 19c to be varied depending on positions of knots. Thus, the position at which the storage case 3 is suspended relative to the outer casing 2 or 2A can be readily changed depending on, for example, weight of the stored article 50.

SUMMARY

As described above, the conveying apparatus 1 includes the stretchable elastic members 17, 17, which include bridging portions 22, 22 bridging the both ends in the fore-aft direction of the outer casing 2 and which are spaced apart from each other in the crosswise direction, and the front-side suspension devices 18, 18 and the rear-side suspension devices 19, 19, which are pivotally supported on the elastic members 17, 17 so as to be rockable about the supported portions 18b, 18b, and 19b, 19b. The storage case 3 is suspended on the elastic members 17, 17 by the front-side suspension devices 18, 18 and the rear-side suspension devices 19, 19 under a condition in which a gap is available between the storage case 3 and the outer casing 2.

Thus, while the traveling structure 100 is traveling, the storage case 3 is movable in the fore-aft direction relative to the outer casing 2 and is pivotally rockable about the supported portions 18b, 18b, and 19b, 19b. Thus, the storage case 3 is moved in a direction in which the storage case 3 is displaced in the vertical direction regardless of posture of the outer casing 2, so that a steady storage condition can be achieved for the stored article 50 during traveling of the traveling structure 100.

In addition, because the elastic members 17, 17 are disposed to be in parallel with each other, the distance between the elastic members 17, 17 remains constant at any position in the fore-aft direction. Thus, the storage case 3 is hard to incline with respect to the vertical direction and an even steadier storage condition can be achieved for the stored article 50 during traveling of the traveling structure 100.

REFERENCE SIGNS LIST 1 conveying apparatus
2 outer casing
3 storage case
17 elastic member
18 front-side suspension device
18a connecting portion
18b supported portion
18c supporting portion
19 rear-side suspension device
19a connecting portion
19b supported portion
19c supporting portion
20 attached portion
22 bridging portion

30 tension adjustment structure
30A tension adjustment structure
30B tension adjustment structure
30C tension adjustment structure
2A outer casing
50 stored article
100 traveling structure
18A front-side suspension device
19A rear-side suspension device

The invention claimed is:

1. A conveying apparatus, comprising:
an outer casing for disposing the conveying apparatus on a traveling structure;
a storage case disposed inside the outer casing, the storage case allowing a stored article to be placed therein and removed therefrom from above;
a plurality of stretchable elastic members spaced apart from each other in a crosswise direction, each of the elastic members including a bridging portion that bridges between front and rear ends of the outer casing in a traveling direction of the traveling structure; and
a plurality of suspension devices spaced apart from each other at least in a fore-aft direction, each of the suspension devices including an upper end assuming a supported portion that is supported slidably on the elastic member and a lower end assuming a supporting portion that supports the storage case, wherein
the suspension devices are supported by the elastic members pivotally rockably about the supported portions,
the storage case is supported by the suspension devices pivotally rockably about the supporting portions, and
the storage case is suspended on the elastic members by the suspension devices under a condition in which a gap is available between the storage case and the outer casing.

2. The conveying apparatus according to claim 1, wherein the elastic members are disposed in parallel with each other.

3. The conveying apparatus according to claim 1 or 2, wherein
the elastic members comprise two elastic members, and
the bridging portions of the two elastic members are disposed at positions immediately above both ends in the crosswise direction, respectively, of the storage case.

4. The conveying apparatus according to claim 1, wherein
the suspension devices each include a connecting portion that connects between the supported portion and the supporting portion, and
the connecting portions are disposed between the storage case and the outer casing.

5. The conveying apparatus according to claim 1, further comprising:
a tension adjustment structure that adjusts tension in the elastic members.

6. The conveying apparatus according to claim 1, wherein each of both ends of each of the elastic members in a direction in which the elastic member is stretched assumes an attached portion to be attached on the traveling structure.

\* \* \* \* \*